United States Patent
Haq et al.

(10) Patent No.: US 11,845,894 B1
(45) Date of Patent: Dec. 19, 2023

(54) METHOD OF RECOVERING HYDROCARBON FROM A RESERVOIR USING DATE LEAF CARBON NANOPARTICLES

(71) Applicant: KING FAHD UNIVERSITY OF PETROLEUM AND MINERALS, Dhahran (SA)

(72) Inventors: Bashirul Haq, Dhahran (SA); Md. Abdul Aziz, Dhahran (SA); Abbad Saeed Hakeem, Dhahran (SA); Dhafer Al Shehri, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/179,847

(22) Filed: Mar. 7, 2023

(51) Int. Cl.
*E21B 43/16* (2006.01)
*C09K 8/584* (2006.01)

(52) U.S. Cl.
CPC ............ *C09K 8/584* (2013.01); *E21B 43/16* (2013.01); *C09K 2208/04* (2013.01); *C09K 2208/10* (2013.01)

(58) Field of Classification Search
CPC ............... C09K 8/584; C09K 2208/04; C09K 2208/10; E21B 43/16
See application file for complete search history.

(56) References Cited

U.S. PATENT DOCUMENTS

| 10,836,952 | B2 | 11/2020 | Haq et al. |
| 10,899,954 | B2 | 1/2021 | Adewole et al. |
| 10,906,812 | B1 | 2/2021 | Salah et al. |
| 2014/0065050 | A1* | 3/2014 | Clemens ............ C01B 21/0685 423/344 |
| 2016/0369157 | A1* | 12/2016 | Agrawal ................. E21B 43/20 |
| 2018/0320056 | A1* | 11/2018 | Mazyar ..................... C09K 8/58 |
| 2019/0299184 | A1* | 10/2019 | Suresh ..................... C09K 8/58 |
| 2020/0056086 | A1* | 2/2020 | Haq ........................ E21B 43/16 |

FOREIGN PATENT DOCUMENTS

| CN | 111807809 B | 12/2021 |
| MY | 170945 A | 9/2019 |

OTHER PUBLICATIONS

Sircar, et al. ; Applications of nanoparticles in enhanced oil recovery ; Petroleum Research 7 ; Aug. 24, 2021 ; 14 Pages.

Martis, et al. ; Energy and Economic Analysis of Date Palm Biomass Feedstock for Biofuel Production in UAE: Pyrolysis, Gasification and Fermentation; MDPI energies ; Nov. 11, 2020 ; 34 Pages.

* cited by examiner

*Primary Examiner* — Silvana C Runyan
(74) *Attorney, Agent, or Firm* — Oblon, McClelland, Maier & Neustadt, L.L.P.

(57) ABSTRACT

A method of recovering a hydrocarbon from a reservoir is described. The method includes injecting an oil recovery formulation into the reservoir, and collecting the hydrocarbon from the reservoir. The oil recovery formulation includes date leaf particles selected from the group consisting of carboxylic acid functionalized date leaf particles and non-functionalized date leaf particles. The date leaf particles have an average particle size of 30 to 950 nanometers (nm). A method for preparing the carboxylic acid functionalized date leaf particles is also provided.

18 Claims, 16 Drawing Sheets

METHOD OF RECOVERING HYDROCARBON FROM A RESERVOIR USING DATE LEAF CARBON NANOPARTICLES

STATEMENT REGARDING PRIOR DISCLOSURE BY THE INVENTORS

Aspects of this technology are described in "Date-leaf carbon particles for green enhanced oil recovery," Nanomaterials, Volume 12, 1245, which is incorporated herein by reference in its entirety.

STATEMENT OF ACKNOWLEDGEMENT

This research was supported by the College of Petroleum and Geosciences (CPG) at King Fahd University of Petroleum and Minerals under the internal grant SF19005, and the Inter-disciplinary Research Center for Hydrogen and Energy Storage.

BACKGROUND

Technical Field

The present disclosure is directed to an oil recovery method, and particularly, to a method for recovering hydrocarbons from a reservoir using date leaf carbon nanoparticles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The subject of carbon-based nanomaterials (CBNs) is gaining importance in the fields of science and technology. Carbon and its allotropes have been used in various applications (such as fiber optics) owing to their physical, chemical, thermal, electrical, and biological properties [Yap, S. H. K., Chan, K. K., Tjin, S. C., & Yong, K. T. (2020). Carbon allotrope-based optical fibers for environmental and biological sensing: A review. Sensors (Switzerland), 20(7)]. Other applications include electrochemical sensors [Ahammad, A. J. S., Odhikari, N., Shah, S. S., Hasan, M. M., Islam, T., Pal, P. R., Ahmed Qasem, M. A., & Aziz, M. A. (2019). Porous tal palm carbon nanosheets: Preparation, characterization, and application for the simultaneous determination of dopamine and uric acid. Nanoscale Advances, 1(2), 613-626; and Ahammad, A. J. S.; Pal, P. R.; Shah, S. S.; Islam, T.; Mahedi Hasan, M.; Qasem, M. A. A.; Odhikari, N.; Sarker, S.; Kim, D. M.; Abdul Aziz, M. Activated jute carbon paste screen-printed FTO electrodes for nonenzymatic amperometric determination of nitrite. J. Electroanal. Chem. 2019, 832, 368-379], electronics [Peng, L. M.; Zhang, Z.; Wang, S. Carbon nanotube electronics: Recent advances. Mater. Today 2014, 17, 433-442], drug delivery [Kong, T.; Hao, L.; Wei, Y.; Cai, X.; Zhu, B. Doxorubicin conjugated carbon dots as a drug delivery system for human breast cancer therapy. Cell Prolif. 2018, 51, e12488], energy storage [Gao, Y. P.; Thai, Z. B.; Huang, K. J.; Zhang, Y. Y. Energy storage applications of biomass-derived carbon materials: Batteries and supercapacitors. New J. Chem. 2017, 41, 11456-11470], solar cells [Kweon, D. H.; Baek, J. B. Edge-Functionalized Graphene Nanoplatelets as Metal-Free Electrocatalysts for Dye-Sensitized Solar Cells. Adv. Mater. 2019, 31, 1804440], environmental pollutant removal [Aziz, M. A.; Chowdhury, I. R.; Mazumder, M. A. J.; Chowdhury, S. Highly porous carboxylated activated carbon from jute stick for removal of Pb' from aqueous solution. Environ. Sci. Pollut. Res. 2019, 26, 22656-22669], construction materials [Dimov, D.; Amit, I.; Gorrie, O.; Barnes, M. D.; Townsend, N. J.; Neves, A. I. S.; Withers, F.; Russo, S.; Craciun, M. F. Ultrahigh Performance Nanoengineered Graphene—Concrete Composites for Multifunctional Applications. Adv. Funct. Mater. 2018, 28, 1705183], and various materials science applications. However, conventional preparation methods for CBNs are complicated and expensive, limiting their utilization.

Consequently, alternative forms of developing CBNs via relatively simple, cost-effective, and sustainable approaches are of great interest. CBN production from biomass could offer an ideal economic and sustainable system. The leaves from trees and other forestry products are abundantly available and often go unused. It would be desirable to utilize this biological waste as a cheap material for conversion into value-added carbon products useful in several potential applications. On the other hand, pyrolysis is a controlled thermochemical treatment technique employed to convert waste or any other biomass into valuable products. It is commonly used to prepare biochar, charcoal, and biogas for various commercial applications. Many waste materials, such as rice husk [Hague, M. A.; Hasan, M. M.; Islam, T.; Razzak, M. A.; Alharthi, N. H.; Sindan, A.; Karim, M. R.; Basha, S. I.; Aziz, M. A.; Ahammad, A. J. S. Hollow Reticular Shaped Highly Ordered Rice Husk Carbon for the Simultaneous Determination of Dopamine and Uric Acid. Electroanalysis 2020, 32, 1957-1970], jute sticks [Aziz, M. A.; Chowdhury, I. R.; Mazumder, M. A. J.; Chowdhury, S. Highly porous carboxylated activated carbon from jute stick for removal of $Pb^{2+}$ from aqueous solution. Environ. Sci. Pollut. Res. 2019, 26, 22656-22669], date palm [Aziz, M. A.; Theleritis, D.; Al-Shehri, M. O.; Ahmed, M. I.; Qamaruddin, M.; Hakeem, A. S.; Helal, A.; Qasem, M. A. A. A Simple and Direct Preparation of a Substrate-Free Interconnected Nanostructured Carbon Electrode from Date Palm Leaflets for Detecting Hydroquinone. ChemistrySelect 2017, 2, 4787-4793], wood waste [Heo, H. S.; Park, H. J.; Park, Y. K.; Ryu, C.; Suh, D. J.; Suh, Y. W.; Yim, J. H.; Kim, S. S. Bio-oil production from fast pyrolysis of waste furniture sawdust in a fluidized bed. Bioresour. Technol. 2010, 101, S91-S96], and tree/plant leaves [Hague, M. A.; Akanda, M. R.; Hossain, D.; Hague, M. A.; Buliyaminu, I. A.; Basha, S. I.; Oyama, M.; Aziz, M. A. Preparation and Characterization of Bhant Leaves-derived Nitrogen-doped Carbon and its Use as an Electrocatalyst for Detecting Ketoconazole. Electroanalysis 2020, 32, 528-535; and Khan, M. Y.; Khan, A.; Adewole, J. K.; Naim, M.; Basha, S. I.; Aziz, M. A. Biomass derived carboxylated carbon nanosheets blended polyetherimide membranes for enhanced $CO_2/CH_4$ separation. J. Nat. Gas Sci. Eng. 2020, 75, 103156] have been converted into value-added products using this technique.

Among methods adopted for nanomaterial preparation, ball milling is a method that allows for the synthesis of nanomaterials on a large scale. It is a top-down technique wherein any powder material is mechanically milled into nanoparticles using balls of various hardness. The kinetics of milling depends on the milling energy, type, and size of the balls, milling speed, temperature, and duration of the milling process. Various nanocrystalline/amorphous materials have been synthesized using this methodology.

In recent years CBNs have been increasingly used in oil recovery. Oil recovery methods can be grouped into primary, secondary, and tertiary. In the first stage, oil is displaced by the natural energy that generally exists in the reservoir. Pressure maintenance by gas or water is implemented in the second phase when primary recovery is no longer economically feasible. Finally, enhanced oil recovery (EOR) or tertiary oil recovery (TOR) is applied to recover additional oil when the secondary method becomes uneconomical. In this phase, gas, liquid chemicals, nanoparticles, heat, or microorganisms are injected to remove 30% to 70% of the residual oil from the reservoir. In the EOR stage, nanoparticles can be added to release trapped oil from the reservoir rock. The main mechanisms of nanoparticle operation in the EOR process include the reduction of interfacial tension (IFT), changes in rheological properties, disjoining pressure, alteration of wettability, and control of mobility [Agista, M. N.; Guo, K.; Yu, Z. A State-of-the-Art Review of Nanoparticles Application in Petroleum with a Focus on Enhanced Oil Recovery. Appl. Sci. 2018, 8, 871; and Cheraghian, G. Khalili Nezhad, S. S., Kamari, M. et al. Adsorption polymer on reservoir rock and role of the nanoparticles, clay and $SiO_2$. Int Nano Lett 4, 114 (2014)].

Carbon nanoparticle applications in EOR have triggered interest due to their characteristics. Carbon nanoparticles utilized in EOR include carbon nanotubes (CNT), single-walled carbon nanotubes, multi-walled carbon nanotubes (MWCNT), and carbon dots. The influence of MWCNT on IFT and surface tension was examined at room temperature by Soleimani et al. (2018) [Soleimani, H., Baig, M. K., Yahya, N., Khodapanah, L., Sabet, M., Demiral, B. M. R., & Burda, M. (2018). Impact of carbon nanotubes based nanofluid on oil recovery efficiency using core flooding. Results in Physics, 9, 39-48].

A-Dots or Arab-D dots were applied in the giant Ghawar field in Saudi Arabia [Kanj, M. Y., Rashid, M. H., & Giannelis, E. P. (2011). Industry-first field trial of reservoir nanoagents. SPE Middle East Oil and Gas Show and Conference, MEOS, Proceedings, 3, 1883-1892]. A core flood experiment was conducted at 95° C. before the field trial and was followed by a post-flood with 120,000 ppm salinity brine.

Despite the utility of carbon-based nanoparticles in oil recovery applications, their high cost has rendered their field applications uneconomical. Therefore, there exists a need to develop a cost-effective carbon nanomaterial and method for its synthesis. In view of the forgoing, the objectives of the present disclosure include providing a novel carbon-based nanoparticle from cheap biomass and explore its potential in EOR processes, and providing a method for its synthesis.

SUMMARY

In an exemplary embodiment, a method of recovering a hydrocarbon from a reservoir is described. The method includes injecting an oil recovery formulation into the reservoir. The method further includes collecting the hydrocarbon from the reservoir. In some embodiments, the oil recovery formulation includes date leaf particles selected from the group consisting of carboxylic acid functionalized date leaf particles and non-functionalized date leaf particles. In some embodiments, a weight ratio of the carboxylic acid functionalized date leaf particles is in a range of 100:1 to 1:100. In some embodiments, the date leaf particles have an average particle size of 30 to 950 nanometers (nm).

In some embodiments, the carboxylic acid functionalized date leaf particles are in the form of nanoparticles having an average particle size of 30 to 300 nm.

In some embodiments, the non-functionalized date leaf particles have an average particle size of 50 to 950 nm.

In some embodiments, the carboxylic acid functionalized date leaf particles contain 60 to atomic % carbon, 25 to 35 atomic % oxygen, 3 to 7 atomic % silicon, and 1 to 3 atomic % zirconium, each atomic % based on a total number of atoms in the carboxylic acid functionalized date leaf particles by EDS.

In some embodiments, the carboxylic acid functionalized date leaf particles are porous with a hierarchical pore structure.

In some embodiments, the carboxylic acid functionalized date leaf particles have a specific surface area in a range of 50 to 100 square meter per gram ($m^2/g$).

In some embodiments, the carboxylic acid functionalized date leaf particles have a cumulative specific pore volume in a range of 0.01 to 0.1 centimeter cube per gram ($cm^3/g$).

In some embodiments, the carboxylic acid functionalized date leaf particles have an average pore width of 1 to 5 nm.

In some embodiments, the non-functionalized date leaf particles have a specific surface area in a range of 280 to 380 $m^2/g$.

In some embodiments, the non-functionalized date leaf particles have a cumulative specific pore volume in a range of 0.1 to 0.5 $cm^3/g$.

In some embodiments, the non-functionalized date leaf particles have an average pore width of 2 to 6 nm.

In some embodiments, the carboxylic acid functionalized date leaf particles are present in the oil recovery formulation at a concentration of 100 to 1500 milligram per litre (mg/L), based on a total weight of the oil recovery formulation.

In some embodiments, the carboxylic acid functionalized date leaf particles have a critical micelle concentration in water of 500 to 700 mg/L.

In some embodiments, the oil recovery formulation is substantially free of carbonaceous materials besides the carboxylic acid functionalized date leaf particles.

In some embodiments, the oil recovery formulation further includes one or more selected from the group consisting of a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitor, a catalyst, a surfactant, a preservative, a biocide, a thermal stabilizer, and a combination thereof.

In some embodiments, the hydrocarbon is an Arab Light crude oil, and the method is an enhanced oil recovery method.

In some embodiments, the injecting forms a mixture of the oil recovery formulation and the Arab Light crude oil with an interfacial tension of 5 to 30 dyne/cm.

In some embodiments, the reservoir has a temperature of 20 to 300° C., and a pressure of 50 to 5500 pound-force per square inch (psi).

In some embodiments, the method includes preparing the carboxylic acid functionalized date leaf particles from date leaves. The method includes cutting the date leaves and drying at 90 to 140° C. The method also includes pulverizing the date leaves after drying and pyrolyzing at 700 to 1000° C. to form pyrolyzed date leaf particles. The method further includes ball-milling the pyrolyzed date leaf particles in the presence of zirconium balls to form milled date leaf particles. In addition, the method involves sonicating the milled date leaf particles in the presence of an acid solution containing sulfuric acid and nitric acid to introduce carboxylic acid functional groups and form crude carboxylic acid functionalized date leaf particles. The method involves washing the crude carboxylic acid functionalized date leaf particles, collecting and drying to form the carboxylic acid functionalized date leaf particles.

In some embodiments, the zirconium balls have a size (diameter) in a range of 500 to 900 µm, and wherein a weight ratio of the zirconium balls to the pyrolyzed date leaf particles is in a range of 1:5 to 1:40.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
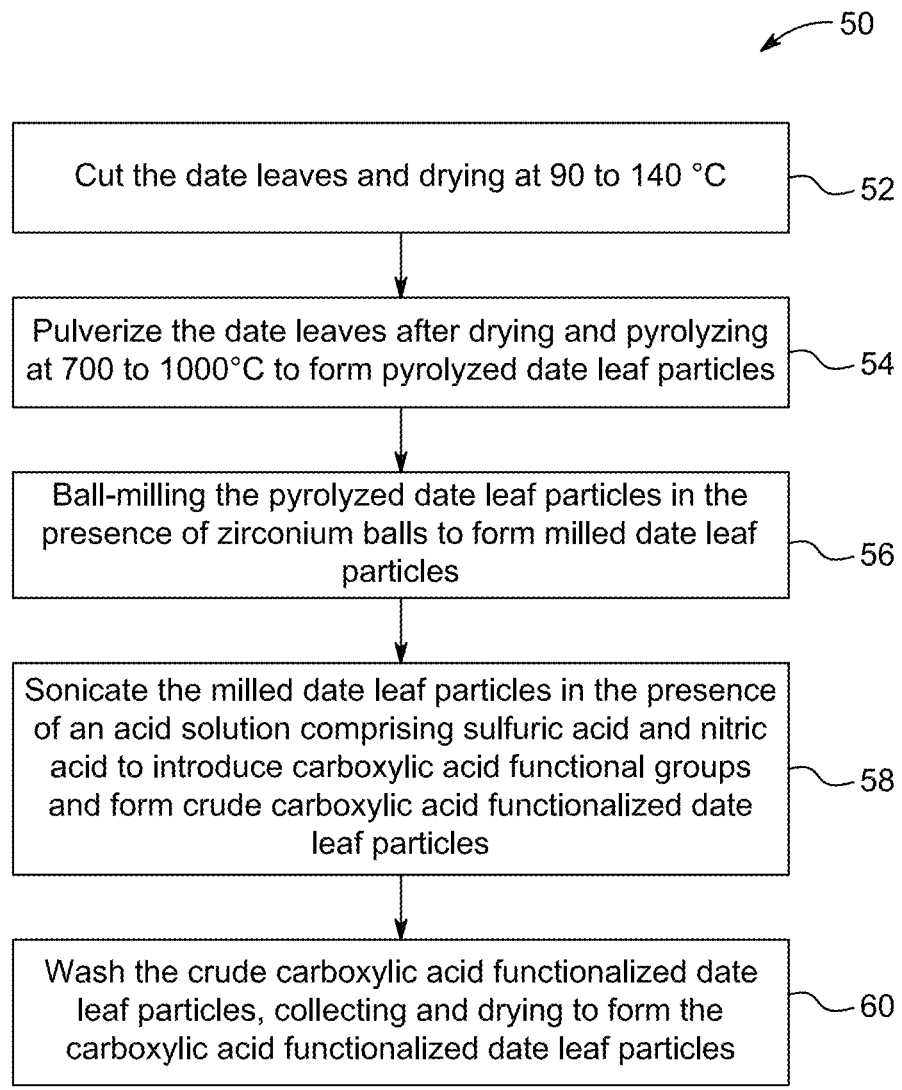
FIG. 1 is a flowchart depicting a method of making carboxylic acid functionalized date leaf particles, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, "hydrocarbon", "petroleum", "crude oil", or "oil" may be used interchangeably to refer to materials originating from subterranean sources which are composed principally of hydrogen and carbon, with significantly smaller amounts (if any) of heteroatoms such as nitrogen, oxygen, and sulfur. For example, crude oil (e.g., liquid petroleum) and natural gas (e.g., gaseous petroleum) are both hydrocarbons.

As used herein, the term "reservoir" refers to a subterranean geological formation (e.g., formed from sedimentary rock) having sufficient porosity and permeability to store and transmit fluids (hydrocarbons).

Aspects of the present disclosure are directed to a method of recovering a hydrocarbon from a reservoir using carbon nanoparticles from an abundantly available and inexpensive carbon source: date leaves. The date leaves can be processed via pyrolysis and a ball-milling technique to produce date leaf carbon nanoparticles (DLCNP) that have useful applications in the EOR process. The DLCNPs produced are characterized using various analytical techniques such as, field emission scanning electron microscopy (FE-SEM), transmission electron microscopy (TEM), energy-dispersive X-ray spectroscopy (EDS), Raman spectroscopy, and Brunauer-Emmett-Teller (BET) method.

The interfacial tension (IFT) between the oil and DLCNP dispersions is measured according to ASTM D971-99a. In some embodiments, the DLCNP dispersion may reduce IFT by at least 50%, preferably at least 45%, or even more preferably at least 40%, from about 40 dyne/cm to 2 dyne/cm, preferably from about 30 dyne/cm to 4 dyne/cm, or even more preferably about 23 dyne/cm to 8.50 dyne/cm. In some embodiments, the oil may be Arabian light crude oil. In some preferred embodiments, three formulations of functionalized and non-functionalized DLCNP solutions (carboxylated DLCNP mixed with distilled water—formulation 1; non-functionalized DLCNP formulated with (the biodegradable) surfactant alkyl polyglycoside and NaCl—formulation 2; and carbon nanotubes formulated with the biodegradable surfactant alkyl polyglycoside and NaCl—formulation 3) were chosen for core floods based on the IFT reduction, to examine their potential for EOR. After water flooding, formulation 1 recovered 9% incremental oil of the oil initially in place (OIIP), while formulation 2 produced 18% more tertiary oil than formulation 3. The method of the present disclosure uses green chemical agents and formulations for EOR applications so that oil can be produced in a more economic and sustainable way.

The present disclosure generally relates to methods of recovering hydrocarbons from a reservoir, for example, in enhanced oil recovery (EOR) applications. The method generally involves injecting an oil recovery formulation into the reservoir, and collecting the hydrocarbon from the reservoir. In some embodiments, the oil recovery formulation contains or consists of date leaf particles selected from the group consisting of carboxylic acid functionalized date leaf particles and non-functionalized date leaf particles in an aqueous or organic medium. In some embodiments, a weight ratio of the carboxylic acid functionalized date leaf particles to the non-functionalized date leaf particles present in the aqueous or organic medium is in a range of 100:1 to 1:100, preferably 80:1 to 1:80, preferably 1:60 to 60:1, preferably 1:40 to 40:1, preferably 1:20 to 20:1, or even more preferably 1:10 to 10:1. Other ranges are also possible. In some further embodiments, the date leaf particles have an average particle size of 30 to 950 nanometers (nm), preferably 50 to 800 nm, preferably 100 to 600 nm, or even more preferably 200 to 400 nm. Other ranges are also possible.

*Phoenix dactylifera*, commonly known as date or date palm, is a flowering plant species in the palm family, Arecaceae, cultivated for its edible sweet fruit known as a "date", which is a staple food in North Africa, the Middle East, and many other locations. Like other palm species such as oil palms and coconut palms, various parts of the date palm, such as the trunk, the stems, the roots, the leaves (or frond or leaflet), the inflorescence, the fruit, the pulp, the empty fruit bunches, the seeds (date pit), the shells/husks of the seeds, the offshoot, etc., can be processed for different materials and for different purposes. The carbonaceous materials formed from the pyrolysis of date leaves in particular; specifically, date leaves that have been processed in a certain way to provide the carboxylic acid functionalized-pyrolyzed date leaf particles, which when used with non-functionalized date leaf particles, can be used to enhance hydrocarbon recovery from oil reservoirs, when used in combination with non-functionalized date leaf particles.

Therefore, in some embodiments, the carbonaceous materials are produced from date leaves. In some further embodiments, the carbonaceous materials may be sourced from other parts of date palm plants, including, but not limited to, date palm trunk, stem, root, inflorescence, fruit ("date"), pulp, empty fruit bunches, seeds (date pit), shells/husks of the seeds, and offshoot, as well as carbonaceous materials sourced from other plants or agricultural products.

Referring to FIG. 1, a method for making carboxylic acid functionalized date leaf particles, is described. The order in which the method 50 described is not intended to be construed as a limitation, and any number of the described method steps can be combined in any order to implement the method 50. Additionally, individual steps may be removed or skipped from the method 100 without departing from the spirit and scope of the present disclosure.

At step 52, the method 50 includes cutting the date leaves and drying at 90 to 140° C. For this purpose, fresh date leaves may be collected or otherwise obtained and cut/chopped into small pieces, and optionally rinsed/cleaned with water. The date leaves are shredded to a size of about 1 to 5 cm, preferably 2 to 4 cm, preferably 2 to 3 cm. The date leaves may be shredded manually or by using a shredder. The cut date leaves may then be dried, for example, in an oven at 90 to 140° C., preferably 95 to 130° C., preferably 100 to 120° C., preferably about 105 to 110° C., to reduce the moisture content to below 5 wt. %, preferably below 4 wt. %, preferably below 3 wt. %, preferably below 2 wt. %, preferably below 1 wt. %. The cut date leaves may be dried for any amount of time that provides an adequately dried product, typically, for drying times of 12 to 48 hours, preferably 16 to 36 hours, preferably 20 to 30 hours, and preferably 24 hours. Other ranges are also possible.

At step 54, the method 50 includes pulverizing the date leaves after drying and pyrolyzing at 700 to 1000° C. to form pyrolyzed date leaf particles. To elaborate, the dried date leaves may next be pulverized using any suitable means, for example, by grinding, ball milling, blending, etc., using manual methods (e.g., mortar) or machine-assisted methods such as using a mechanical blender, or any other apparatus known to those of ordinary skill in the art. The dried date leaves are preferably pulverized until an average particle size of less than 50 µm, preferably less than 40 µm, preferably less than 30 µm, and preferably less than 20 µm is achieved. In preferred embodiments, the dried date leaves are pulverized in the presence of metal bicarbonate, including, but not limited to, sodium bicarbonate, potassium bicarbonate, cesium bicarbonate, magnesium bicarbonate, and calcium bicarbonate, preferably sodium bicarbonate. In preferred embodiments, the weight ratio of dried date leaves to metal bicarbonate ranges from 1:1 to 1:7, preferably 1:2 to 1:6, preferably 1:3 to 1:5, preferably 1:4. Other ranges are also possible.

The mixed powders (pulverized date leaves and metal bicarbonate powder) are next subject to pyrolysis, i.e., a process of thermochemical decomposition at elevated temperatures and in the absence of an oxidizing agent such as oxygen, hydrogen peroxide, and/or a halogen-containing gas (e.g., a chlorine-containing gas). In some embodiments, pyrolysis is performed in an inert gas (e.g., nitrogen, helium, neon, and/or argon), preferably nitrogen, and in a temperature range of 700 to 1,000° C., preferably 725 to 975° C., preferably 750 to 950° C., preferably 775 to 925° C., preferably 800 to 900° C., preferably 825 to 875° C., preferably 850° C. Other ranges are also possible. Pyrolysis of the pulverized date leaves preferably forms a solid, for example, a carbonaceous ash/char/tar that mainly contains carbon and heteroatoms (e.g. nitrogen, oxygen), along with silicon, and in some cases, minor amounts of other elements and minerals such as Al, Fe, Ca, Mg, K, Na, and the like. The pyrolysis of the pulverized date leaves may also form volatile compounds, which may evaporate during the pyrolysis, thus leaving behind the pyrolyzed date leaf particles. In some embodiments, pyrolysis may be performed by placing the mixed powders into a furnace such as a tube furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min, preferably up to 5° C./min. In preferred embodiments, the mixed powders are heated with a heating rate in the range of 1 to 15° C./min, preferably 3 to 10° C./min, preferably 5 to 6° C./min to an elevated temperature described above, and the powders are heated at such an elevated temperature (e.g., 850° C.) for 1 to 15 hours, preferably 2 to 10 hours, preferably 3 to 8 hours, preferably 4 to 6 hours, preferably 5 hours. Preferably, the mixed powders (pulverized date leaves and metal bicarbonate powder) are isothermally heated at elevated temperatures. The furnace may also be equipped with a cooling accessory such as a cooling air stream system, or a liquid nitrogen stream system, which may provide a cooling rate of up to 20° C./min, or preferably up to 15° C./min, or preferably up to 10° C./min. Other ranges are also possible.

At step 56, the method 50 includes ball-milling the pyrolyzed date leaf particles in the presence of zirconium balls to form milled date leaf particles. The purpose of ball milling the pulverized date leaf particles may be to reduce the particle size of the pyrolyzed date leaf particles. In an embodiment, the ball-milling is carried out at a speed of 2,000 rpm-6000 rpm, preferably 3000 rpm, for approximately 2-15 hours, preferably for 3-15 hours, and more preferably for 15 hours to form milled date leaf particles. Zirconium balls of size 400 to 1000 μm in size (diameter), preferably 500-900 μm in size, preferably 600-800 μm in size, are used to grind the pyrolyzed date leaf particles to form milled date leaf particles having nanoparticle size. Zirconium balls may be used owing to their smooth surface, good sphericity, and high grinding strength. In an embodiment, the weight ratio of the zirconium balls to the pyrolyzed date leaf particles is in a range of 1:5 to 1:40, preferably 1:10 to 1:30, and more preferably about 1:20, was used to form the milled date leaf particles. Other ranges are also possible.

At step 58, the method 50 includes sonicating the milled date leaf particles in the presence of an acid solution, including sulfuric acid and nitric acid, to introduce carboxylic acid functional groups and form crude carboxylic acid functionalized date leaf particles. In some embodiments, the mixture of sulfuric acid (conc.) and nitric acid (conc.) is in a volume ratio of 1:1 to 5:1, preferably 2:1 to 4:1, preferably 3:1. In some further embodiments, the concentration of the pyrolyzed date leaf particles in the acid solution may vary, but typical concentration values range from 1 to 4 g/mL, preferably 1.5 to 3 g/mL, preferably 2 to 2.5 g/mL (g of pyrolyzed date leaf particles per 1 mL of acid solution). The pyrolyzed date leaf particles may be treated with the acid solution using any known agitation method known to those of ordinary skill in the art, for example, via stirring, swirling, mixing, sonicating (e.g., ultrasonication or sonication) for any amount of time needed to introduce an adequate carboxylic acid content. In some preferred embodiments, treatment times may range from 1 to 12 hours, preferably 2 to 10 hours, preferably 3 to 8 hours, preferably 4 to 6 hours, and preferably 5 hours. At the end of the treatment to introduce carboxylic acid functional groups, the reaction mixture may be diluted with water and held under static conditions to form separate layers of carboxylic acid functionalized-pyrolyzed date leaf particles and mother liquor. The mother liquor may be removed, for example, via decantation, and the water dilution and decantation process may be repeated, for example, up to 6 times, after which the carboxylic acid functionalized-pyrolyzed date leaf particles may be dried at 50 to 80° C., preferably 55 to 75° C., preferably 60 to 70° C., for 12 to 48 hours, preferably 20 to 30 hours, preferably 24 to 26 hours. Other ranges are also possible.

At step 60, the method 50 includes washing the crude carboxylic acid functionalized date leaf particles, collecting, and drying them to form the carboxylic acid functionalized date leaf particles. At this step, the carboxylic acid functionalized date leaf particles may be washed with water at least 1 time, at least 3 times, at least 7 times, or even more preferably at least 15 times, to remove any excess acid with de-ionized water, followed by drying to form the carboxylic acid functionalized date leaf particles. In some further embodiments, the drying may be carried out in an oven at 50 to 80° C., preferably 55 to 75° C., preferably 60 to 70° C., for 6 to 24 hours, preferably 8 to 20 hours, preferably 10 to 18 hours, preferably 12 to 16 hours to provide the carboxylic acid functionalized date leaf particles. Other ranges are also possible.

Figure 6A:
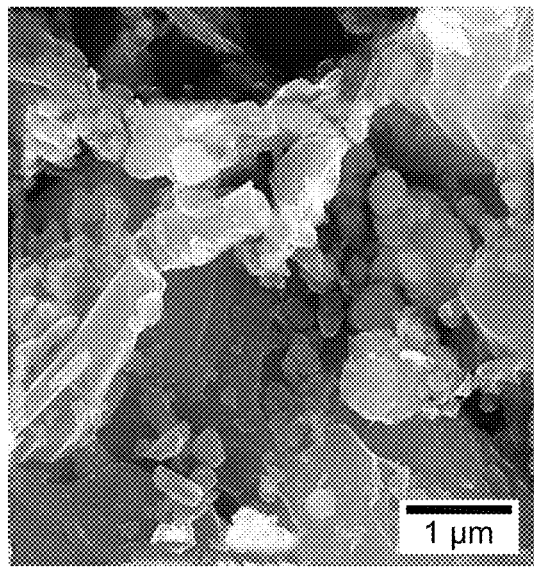
FIGS. 6A and 6B show field emission scanning electron microscope (FE-SEM) images of ground carbon at two different magnifications, according to certain embodiments of the present disclosure.
Figure 6B:
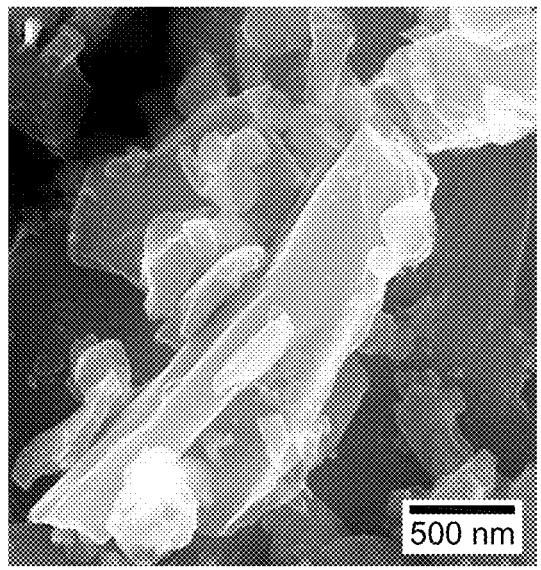
Figure 6C:
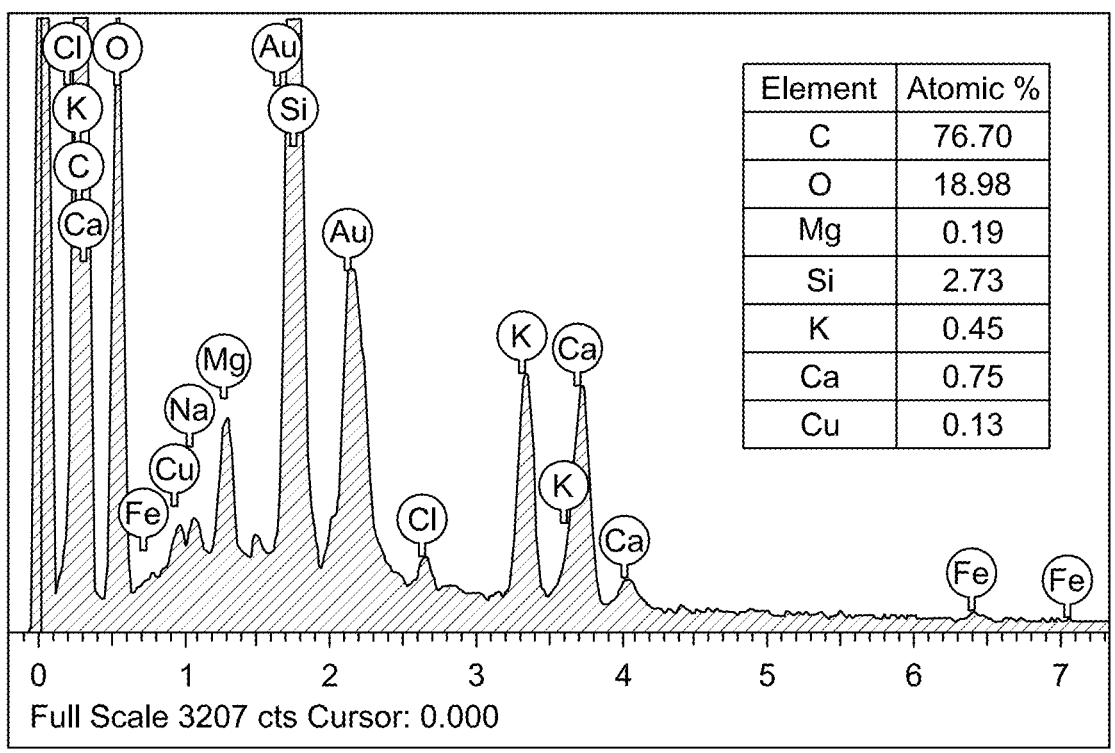
FIG. 6C shows an Energy-dispersive X-ray spectroscopy (EDS) image depicting an atomic percentage of various elements present in ground carbon, according to certain embodiments of the present disclosure.

Referring to FIG. 6C, the elemental constitution of the carboxylic acid functionalized date leaf particles may vary depending on a number of factors, such as the type of date palm tree cultivated, the source/location of the date palm tree cultivated, the pyrolysis conditions, as well as the post-pyrolysis processing, (e.g., the extent of carboxylic acid functional group installation). In some embodiments, the dispersive X-ray spectroscopy (EDS) may be performed on a Lyra-3 attachment to the field emission scanning electron microscopy (FE-SEM) (Tescan Lyra-3) through the LINK INCA program operating at 150 to 250 kilovolts (kV). In some further embodiments, the carboxylic acid functionalized date leaf particles effective in the methods herein generally includes carbon in an amount of 55 to 85 atomic wt. %, preferably 60 to 80 atomic wt. %, preferably 67 to 76 atomic wt. %; oxygen in an amount of 15 to 25 atomic wt. %, preferably 16 to 24.5 atomic wt. %, preferably 17 to 24 atomic wt. %, preferably 18 to 23.5 atomic wt. %, preferably 18 to 21 atomic wt. %; and silicon in an amount of 1 to 15 atomic wt. %, preferably 1.5 to 12 atomic wt. %, preferably 2 to 10 atomic wt. %, preferably 2.5 to 7 atomic wt. %, and zirconium in an amount of 0.1 to 5 atomic weight. %, preferably 0.2 to 4 atomic wt. %, and more preferably 0.4 to 3 atomic wt. % zirconium, each based on the total weight of the carboxylic acid functionalized date leaf particles by EDS, and in some cases, minor amounts of one or more of Ca, Mg, K, Cu, and the like. Other ranges are also possible.

As the composition of date palm leaves generally differs from the composition of other date palm plant parts (e.g., date palm trunk, date palm pits, etc.) and other plants or agricultural products, the carboxylic acid functionalized-pyrolyzed date leaf particles obtained from the date palm leaves processing steps described above generally have a different composition from carbonaceous materials obtained from the pyrolysis/treatment of other plants or agricultural products, such as those made from date palm plant parts other than date palm leaves.

Figure 8A:
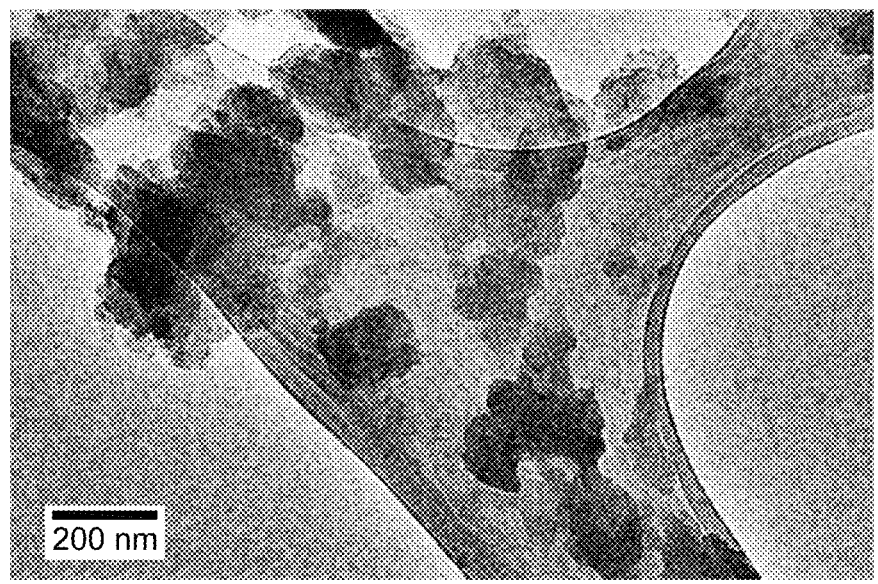
FIG. 8A is a transmission electron microscope (TEM) image of carboxylic-functionalized nanosized date carbon, according to certain embodiments of the present disclosure.
Figure 8B:
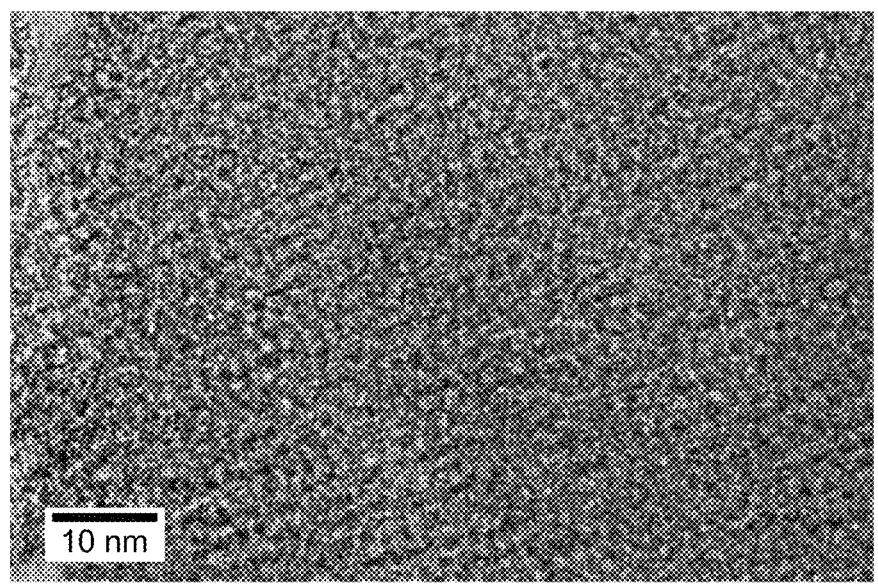
FIG. 8B is a high-resolution transmission electron microscope (HR-TEM) image of carboxylic-functionalized nanosized date carbon, according to certain embodiments of the present disclosure.

In some embodiments, the carboxylic acid functionalized date leaf particles are in the form of microparticles (solid) having an average particle size of 20 to 400 nm, preferably 30 to 300 nm, preferably 50 to 250 nm, preferably 50 to 150 nm, wherein the average particle size is measured using the longest linear dimension of the particles. Referring to FIGS. 8A to 8B, the nanoparticles may be formed in a variety of shapes/morphologies, preferably the nanoparticles are in the form of randomly shaped angular particles, and randomly shaped rounded particles. Other ranges are also possible.

The carboxylic acid functionalized date leaf particles are preferably porous. In some embodiments, the carboxylic acid functionalized date leaf particles contain mesopores. In some embodiments, the carboxylic acid functionalized date leaf particles contain micropores. In preferred embodiments, the carboxylic acid functionalized date leaf particles have a hierarchical pore structure and contain both mesopores and micropores. In preferred embodiments, the carboxylic acid functionalized date leaf particles have a hierarchical pore structure with an average pore width of 0.5 to 10 nm, preferably 0.6 to 9 nm, preferably 0.8 to 8 nm, preferably 1 to 7 nm, preferably 1 to 5 nm. In some embodiments, the carboxylic acid functionalized date leaf particles have a specific pore volume of 0.01 to 1.0 cm$^3$/g, preferably 0.1 to 0.9 cm$^3$/g, preferably 0.1 to 0.5 cm$^3$/g. In some embodiments, the carboxylic acid functionalized date leaf particles have a BET surface area of 10 to 300 m$^2$/g, preferably 20 to 280 m$^2$/g, preferably 30 to 250 m$^2$/g, preferably from 50 to 100 m$^2$/g, preferably from 70 to 100 m$^2$/g. In some embodiments, the carboxylic acid functionalized date leaf particles have a cumulative specific pore volume in a range of 0.001 to 1 cm$^3$/g, preferably 0.01 to 0.5 cm$^3$/g, preferably 0.01 to 0.3 cm$^3$/g, preferably from 0.01 to 0.1 cm$^3$/g. Other ranges are also possible. In some embodiments, the BET analysis is performed on a BELSORP analyzer according to the software manual, pages 62 to 66, manufactured by Bell Japan.

In some embodiments, the carboxylic acid functionalized date leaf particles have a critical micelle concentration (CMC) (i.e., the concentration above which micelles form and IFT tends to remain substantially constant) in water/oil mixtures (25° C.) of 500 to 700 ppm, preferably 510 to 690 ppm, preferably 520 to 680 ppm, preferably 530 to 670 ppm, preferably 540 to 660 ppm, preferably 550 to 650 ppm, preferably 560 to 640 ppm, preferably 570 to 630 ppm, preferably 580 to 620 ppm, preferably 590 to 610 ppm, preferably 600 ppm. Other ranges are also possible.

The oil recovery formulation may optionally be formulated to include carbonaceous materials such as graphene, graphene oxide, reduced graphene oxide, carbon nanotubes, carbon nanofibers, and glassy carbon micro/nano-spheres, as well as comminuted materials or carbonaceous materials sourced from other plants or agricultural products (besides the carboxylic acid functionalized-pyrolyzed date leaf particles). In preferred embodiments, besides the carboxylic acid functionalized date leaf particles and the non-functionalized date leaf particles, the oil recovery formulation is substantially free of carbonaceous materials.

The oil recovery formulation includes carboxylic acid functionalized date leaf particles and non-functionalized date leaf particles. The carboxylic acid functionalized date leaf particles are present in the oil recovery formulation at a concentration of 100 to 1500 mg/L, based on the total weight of the oil recovery formulation.

In an embodiment, the non-functionalized date leaf particles are particles of date leaves particles obtained by mechanical treatment—such as pulverization, ball-milling, grinding, and/or a combination thereof. In some embodiments, the non-functionalized date leaf particles are obtained by one or more steps selected from cutting the date leaves, pulverizing, and ball milling.

The non-functionalized date leaf particles have an average particle size that is greater than the average particle size of the carboxylic acid functionalized date leaf particles. This may be because the carboxylic acid functionalized date leaf particles were subjected to the steps of pulverization, ball-milling, and acid treatment, resulting in a reduction of their particle size. Referring to FIGS. 7A to 7F, in some embodiments, the non-functionalized date leaf particles have an average particle size of 10 to 2000, preferably 10 to 1000 nm, preferably 20 to 980 nm, preferably 30 to 970 nm, and more preferably 50 to 950 nm. In some embodiments, the average particle size of the non-functionalized date leaf particles was found to be higher than the average particle size of the carboxylic acid functionalized date leaf particles. The non-functionalized date leaf particles have a specific surface area in a range of 200 to 400 m$^2$/g, preferably 220 to 390 m$^2$/g, preferably 230 to 385 m$^2$/g, and preferably 280 to 380 m$^2$/g, as determined by BET analysis. Other ranges are also possible. In some embodiments, the BET analysis is performed on a BELSORP analyzer according to the software manual, pages 62 to 66, manufactured by Bell Japan.

The non-functionalized date leaf particles have a cumulative specific pore volume in a range of 0.05 to 1 cm$^3$/g, 0.1 to 0.8 cm$^3$/g, or even more preferably 0.1 to 0.5 cm$^3$/g. The non-functionalized date leaf particles have an average pore width of 1 to 10 nm, preferably 1.5 to 9 nm, preferably 1.5 to 8 nm, preferably 2 to 6 nm. The non-functionalized date leaf particles have a cumulative specific pore volume in a range of 0.01 to 1 cm$^3$/g, preferably 0.05 to 0.75 cm$^3$/g, preferably 0.75 to 0.8 cm$^3$/g, preferably 0.1 to 0.5 cm$^3$/g. Other ranges are also possible.

The oil recovery formulation may further comprise one or more selected from the group consisting of a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitor, a catalyst, a surfactant, a preservative, a biocide, a thermal stabilizer, and a combination thereof. In some embodiments, when present, the additive(s) may be incorporated in an amount of up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, preferably up to 0.05 wt. %, preferably up to 0.01 wt. %, based on a total weight of the oil recovery formulation. Other ranges are also possible.

Additive(s) suitable for use in oil and gas well operations, and particularly during oil recovery operations, are known by those of ordinary skill in the art, and may include, but are not limited to, viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan) as well as synthetic gelling agents (e.g., polyacrylamides and co-polymers thereof, psyllium husk powder, hydroxyethyl cellulose, carboxymethylcellulose, and polyanionic cellulose, poly(diallyl amine), diallyl ketone, diallyl amine, styryl sulfonate, vinyl lactam, laponite.

The oil recovery formulation may also optionally include one or more surfactants. The surfactant(s), when present, may be included in an amount of up to 5 wt. %, preferably up to 4 wt. %, preferably up to 3 wt. %, preferably up to 2 wt. %, preferably up to 1 wt. %, preferably up to wt. %, preferably up to 0.1 wt. %, preferably up to 0.05 wt. %, preferably up to 0.01 wt. %, based on a total weight of the oil recovery formulation. Cationic, anionic, non-ionic, and/or amphoteric surfactants may be employed herein. Cationic surfactants may include, but are not limited to a protonated amine formed from a reaction between a $C_6$-$C_{26}$ alkyl amine compound and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, etc.), such as protonated salts of $C_6$-$C_{26}$ alkyl monoamines, $C_6$-$C_{26}$ alkyl (poly)alkylene polyamines, and alkoxylated fatty amines; a protonated $C_6$-$C_{26}$ alkyl amidoamine formed from a reaction between a $C_6$-$C_{26}$ alkyl amidoamine compound and an acid (for example the acids listed above), such as protonated forms of the amide reaction product between any fatty acid (or ester derivative thereof) with a polyamine (e.g., putrescine, cadaverine, ethylene diamine, N1,N1-dimethylethane-1,2-diamine, $N^1$,$N^1$-dimethylpropan-1,3-diamine, $N^1$,$N^1$-diethylethane-1,2-diamine, $N^1$,$N^1$-diethylpropane-1,3-diamine, spermidine, 1,1,1-tris(aminomethyl)ethane, tris(2-aminoethyl)amine, spermine, TEPA, DETA, TETA, AEEA, PEHA. HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine), with specific mention being made to protonated forms of stearamidopropyldimethylamine, stearamidopropyldiethylamine, stearamidoethyldiethylamine, stearamidoethyldimethylamine, palmitamidopropyl dimethylamine, palmitamidopropyl diethylamine, palmitamidoethyl diethylamine, palmitamidoethyldimethylamine, behenamidopropyl dimethylamine, behenamidopropyl diethylmine, behenamidoethyl diethylamine, behenamidoethyl dimethylamine, arachidamidopropyl dimethylamine, arachidamidopropyl diethylamine, arachidamidoethyl diethylamine, and arachidamidoethyl dimethylamine; and a quaternary ammonium compound made from alkylation with suitable alkylating agents (e.g., dimethyl sulfate, methyl chloride or bromide, benzyl chloride or bromide, $C_6$-$C_{26}$ alkyl chloride or bromide, etc.) of a tertiary $C_6$-$C_{26}$ alkyl amine, an alkoxylated (tertiary) amine, or an aprotic nitrogenous heteroarene (optionally substituted) having at least one aromatic nitrogen atom with a reactive lone pair of electrons, with specific mention being made to a tri-fatty alkyl lower alkyl ammonium compound (e.g., trioctyl methyl ammonium chloride), a $C_{10}$-$C_{18}$ alkyl trimethyl ammonium chloride or methosulfate, a di-$C_{10}$-$C_{18}$ alkyl dimethyl ammonium chloride or methesulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, and cetylpyridinium chloride as well as mixtures thereof. Anionic surfactants may include, but are not limited to sulfates, such as alkyl sulfates, alkyl-ester-sulfates, alkyl ether sulfates, alkyl-alkoxy-ester-sulfate, sulfated alkanolamides, glyceride sulfates, in particular, sulfates of fatty alcohols or polyoxyalkylene ethers of fatty alcohols such as sodium dodecyl sulfate, sodium laureth sulfate, ammonium lauryl sulfate, potassium lauryl sulfate, sodium myreth sulfate; sulfonates such as alkyl sulfonates, fatty alkyl-benzene sulfonates, lower alkyl-benzene sulfonates, alpha olefin sulfonates, lignosulfonates, sulfocarboxylic compounds, for example, dodecyl benzene sulfonate, dioctyl sodium sulfosuccinate, perfluorooctanesulfonate (PFOS), perfluorobutanesulfonate; phosphates such as alkyl acyl ether phosphates, alkyl ether phosphates, phosphates of fatty alcohols or polyoxyalkylene ethers of fatty alcohols such as cetyl phosphate salts, dicetyl phosphate salts, ceteth-10-phosphate salts; carboxylate salts of fatty acids, acylamino acids, lactylates, and/or fatty alcohols/polyoxyalkylene ethers of fatty alcohols such as sodium stearate, vegetable oil-based anionic surfactants (e.g., palm oil anionic surfactant), sodium behenoyl lactylate, sodium isostearoyl lactylate, sodium caproyl lactylate, sodium laureth-5 carboxylate, sodium laureth-6 carboxylate, sodium laureth-11 carboxylate; and mixtures thereof.

Non-ionic surfactants may include, but are not limited to amides or alkanolamides of fatty acids, that is, amide reaction products between a fatty acid and an amine or alkanolamine compound, such as coconut fatty acid monoethanolamide (e.g., N-methyl coco fatty ethanol amide), coconut fatty acid diethanolamide, oleic acid diethanolamide, palm based oleylamine, and vegetable oil fatty acid diethanolamide; alkoxylated alkanolamides of fatty acids, preferably ethoxylated and/or propoxylated variants of the alkanolamides of fatty acids using for example anywhere from 2 to 30 E0 and/or PO molar equivalents, preferably 3 to 15 EO and/or PO molar equivalents, preferably 4 to 10 E0 and/or PO molar equivalents, preferably 5 to 8 E0 and/or PO molar equivalents per moles of the alkanolamide of the fatty acid (e.g., coconut fatty acid monoethanolamide with 4 moles of ethylene oxide); amine oxides, such as N-cocoamidopropyl dimethyl amine oxide and dimethyl $C_6$-$C_{22}$ alkyl amine oxide (e.g., dimethyl coco amine oxide); fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters; ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols; alkyl polyglycosides (APGs) such as those made from reaction between fatty alcohols and glucose; and mixtures thereof.

Amphoteric surfactants may include, but are not limited to $C_6$-$C_{22}$ alkyl dialkyl betaines, such as fatty dimethyl betaines (R—N(CH$_3$)$_2$($\pm$)—CH$_2$COO—), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium); $C_6$-$C_{22}$ alkyl amido betaines (R—CO—NH—CH$_2$CH$_2$CH$_2$—N(CH$_3$)$_2$($\pm$)—CH$_2$COO— or R—CO—NH—CH$_2$CH$_2$—N(CH$_3$)$_2$($^+$)—CH$_2$COO—), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethylamino betaine; $C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N(CH$_3$)$_2$($^+$)—CH$_2$CH$_2$CH$_2$SO$_3$— or R—CO—NH—CH$_2$CH$_2$CH$_2$—N(CH$_3$)$_2$($^+$)—CH$_2$CH$_2$CH$_2$SO$_3$— or R—CO—NH—CH$_2$CH$_2$—N(CH$_3$)$_2$($^+$)—CH$_2$CH$_2$CH$_2$SO$_3$—) or a hydroxysulfonic group (R—N(CH$_3$)$_2$($^+$)—CH$_2$CH(OH)—CH$_2$SO$_3$— or R—CO—NH—CH$_2$CH$_2$CH$_2$—N(CH$_3$)$_2$($^+$)—CH$_2$CH(OH)—CH$_2$SO$_3$— or R—CO—NH—CH$_2$CH$_2$—N(CH$_3$)$_2$($^+$)—CH$_2$CH(OH)—CH$_2$SO$_3$—), such as $C_{10}$-$C_{18}$ dimethyl hydroxysultaine and $C_{10}$-$C_{18}$ amido propyl dimethylamino hydroxysultaine; and mixtures thereof. In preferred embodiments, the oil recovery formulation is substantially free of a surfactant.

Suitable examples of chelating agents useful as sequestration agents of metal ions include, but are not limited to, iron control agents, such as ethylene diamine tetra acetic acid (EDTA), diethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-para-methyl phenyl acetic acid (EDDHMA), and ethylene diamine di-ortho-hydroxy-para-carboxy-phenyl acetic acid (EDDCHA). Suitable examples of gel stabilizers/stabilizing agents include, but are not limited to, polypropylene glycol, polyethylene glycol, carboxymethyl cellulose, hydroxyethyl cellulose, polysiloxane polyalkyl polyether copolymers, acrylic copolymers, alkali metal alginates and other water-soluble alginates, carboxy vinyl polymers, ppolyvinylpyrrolidone and polyacrylates.

Suitable examples of dispersing agents include, but are not limited to, polymeric or co-polymeric compounds of polyacrylic acid, polyacrylic acid/maleic acid copolymers, styrene/maleic anhydride copolymers, polymethacrylic acid and polyaspartic acid. Suitable examples of corrosion inhibitors include, but are not limited to, alkoxylated fatty amines, chromates, zinc salts, (poly)phosphates, organic phosphorus compounds (phosphonates), acetylenic alcohols such as propargylic alcohol, α,β-unsaturated aldehydes such as cinnameldehyde and crotonaldehyde, aromatic aldehydes such as furfural, p-anisaldehyde, phenones including alkenyl phenones such as phenyl vinyl ketone, nitrogen-containing heterocycles such as imidazolines, piperazines, hexamethylene tetramines, quaternized heteroarenes such as 1-(benzyl)quinolinium chloride, and condensation products of carbonyls and amines such as Schiff bases.

Suitable examples of scale inhibitors include, but are not limited to, sodium hexametaphosphate, sodium tripolyphosphate, hydroxy ethylidene diphosphonic acid, aminotris(methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates and co-polymers thereof.

Suitable examples of defoaming agents include, but are not limited to, silicone oils, silicone oil emulsions, organic defoamers, emulsions of organic defoamers, silicone-organic emulsions, silicone-glycol compounds, silicone/silica adducts, emulsions of silicone/silica adduct. Suitable examples of emulsifiers include, but are not limited to, a tallow amine, a ditallow amine, or combinations thereof, for example, a 50% concentration of a mixture of tallow alkyl amine acetates, C16-C18 (CAS 61790-60) and ditallow alkyl amine acetates (CAS 71011-03-5) in a suitable solvent such as heavy aromatic naphtha and ethylene glycol; as well as mixtures thereof.

In some embodiments, the oil recovery formulation is substantially free of an additive (e.g., viscosity modifying agent, a chelating agent, a stabilizing agent, a dispersing agent, a corrosion inhibitor, a scale inhibitor, a stabilizing agent, a defoaming agent, and an emulsifier). In some embodiments, the oil recovery formulation is substantially free of polymers, including both water-soluble and oil-soluble polymers. In preferred embodiments, the oil recovery formulation is substantially free of a polysaccharide (e.g., xanthan gum, scleroglucan, and diutan) and a quaternary ammonium surfactant.

The methods of the present disclosure generally relate to the recovery of hydrocarbons from a reservoir involving injection of the oil recovery formulation into the reservoir to aid/enhance the recovery of hydrocarbons from the reservoir. The carboxylic acid functionalized date leaf particles, non-functionalized date leaf particles, and any optional additives (oil recovery formulation) of the present disclosure can be used in secondary recovery processes such as waterflooding or surfactant flooding processes, or in tertiary recovery processes such as enhanced oil recovery (e.g., chemical injection EOR).

Chemical EOR is an oil recovery enhancement method that is designed to alter the original properties of oil. While typically carried out after secondary recovery, the techniques employed during enhanced oil recovery can be initiated at any time during the productive life of an oil reservoir. The purpose of EOR is to restore formation pressure and improve oil displacement or fluid flow in the reservoir. In preferred embodiments, the oil recovery formulation is used for enhanced oil recovery operations.

The carboxylic acid functionalized date leaf particles and non-functionalized date leaf particles, and any optional additives may be added using any addition/dosing/mixing techniques known by those of ordinary skill in the art, including both manual and automatic addition techniques. For example, the addition may be carried out by using inline static mixers, inline mixers with velocity gradient control, inline mechanical mixers with variable speed impellers, inline jet mixers, motorized mixers, batch equipment, and appropriate chemical injection pumps and/or metering systems.

In any of the above applications, the oil recovery formulation may be injected down the annulus of a well. The method may be performed by injecting the oil recovery formulation into a first wellbore (e.g. an injection wellbore) connected to the reservoir and then collecting hydrocarbons from a second wellbore (e.g. a production wellbore) that is connected to the reservoir. Alternatively, the method may be performed by injecting the oil recovery formulation into a wellbore connected to the reservoir and then collecting hydrocarbons from the same wellbore. The injection may proceed through suitable injection lines to areas where additional oil recovery (i.e., after primary recovery) is desired through capillaries or umbilical lines. The injection may be performed manually, or it may be automatic, for example, by using chemical injection pumps. In some embodiments, the oil recovery formulation may be stored in a chemical storage tank, and a chemical injection pump associated therewith may be used to introduce the oil recovery formulation into the desired location of the operation. In any of the above applications, the oil recovery formulation or any of its components combinable downhole may be injected continuously and/or in batches. The chemical injection pump(s) can be automatically or manually controlled to inject any amount of the oil recovery formulation needed for secondary and/or tertiary oil recovery operations.

Injection pressures and temperatures of the composition may be kept constant or varied. In some embodiments, the injection pressure of the oil recovery formulation is up to 6,000 psi, preferably 25 to 6,000 psi, preferably 50 to 6,000 psi, preferably 50 to 5,750 psi, preferably 50 to to 5500 psi. Other ranges are also possible.

The amount of oil recovery formulation injected may vary depending on the well set-up, the formation type, the type of oil to be displaced, the type of recovery (e.g., secondary versus tertiary), the oil recovery desired, and many other factors, and an oilfield technician of ordinary skill can determine the appropriate amount of the oil recovery formulation to inject to suit a particular recovery operation.

The oil recovery formulation used herein may substantially increase the yield of hydrocarbons from underground reservoirs such as carbonate reservoirs (e.g., predominantly limestone) or sandstone reservoirs (e.g., primarily siliclastic rocks and clay), and may be particularly useful for increasing the yield of hydrocarbons in reservoirs of high-temperature water sources, high salinity water sources, or high temperature/high salinity water sources, for example, from carbonate reservoirs. Alternatively, the reservoir may be a tight shale reservoir formed by hydraulic fracturing. In some embodiments, the reservoir has a temperature of 10 to 450° C., preferably 20 to 400° C., and more preferably 20 to 300° C. Other ranges are also possible.

The hydrocarbon displaced from the reservoir herein, and subsequently collected, is preferably a crude oil. The crude oil may be a very light crude oil such as Arab Extra Light, Arab Super Light, or Arab Super Light Ardjuna crude oil (e.g., a jet fuel, gasoline, kerosene, petroleum ether, petroleum spirit, or petroleum naphtha crude oil), a light crude oil such as Arab Light or Arab Light/Seg 17 Blend crude oil (e.g., grade 1 and grade 2 fuel oil, diesel fuel oil, domestic fuel oil), a medium crude oil such as Arab Medium crude oil, and a heavy crude oil such as Arab Heavy crude oil (e.g., grade 3, 4, 5, and 6 fuel oil, heavy marine fuel). Both sweet (sulfur volume lower than 0.50%) and sour (sulfur volume higher than 0.50%) crude oils may be displaced and recovered/collected according to the methods herein.

In preferred embodiments, the crude oil is a light or medium crude oil, preferably a light crude oil, preferably Arabian Light crude oil, preferably Arabian Light crude oil having a density at 25° C. of 0.81 to 0.83 g/mL, preferably 0.815 to 0.8298 g/mL, preferably 0.82 to 0.8296 g/mL, preferably 0.822 to 0.8294 g/mL, preferably 0.824 to 0.829 g/mL, preferably 0.826 to 0.8288 g/mL, preferably 0.828 to 0.8286 g/mL. Other ranges are also possible.

After the injecting, a mixture of the oil recovery formulation and the crude oil (e.g., Arab Light crude oil) is formed, which may then be brought to the surface for collection. Preferably, the mixture of the oil recovery formulation and the crude oil has a reduced interfacial tension (IFT) compared to the IFT of the crude oil alone. In some embodiments, the mixture of the oil recovery formulation and the crude oil has an interfacial tension of 5 to 30 dyne/cm, preferably 10 to 20 dyne/cm, preferably 6 to 28 dyne/cm, preferably 7 to 25 dyne/cm, preferably 8 to 24 dyne/cm, preferably 8.5 to 23 dyne/cm, as determined for example according to ASTM D971-99a. Other ranges are also possible.

After the injecting, the hydrocarbon (e.g., crude oil)/water mixture brought to the surface may then be separated using techniques known to those of ordinary skill in the art into respective aqueous and oil phases for further processing (e.g., crude oil refining/upgrading/processing). For example, the oil/water mixture may be separated at a fluids processing facility using emulsion breakers, water clarifiers, and/or other oil/water separation techniques known to those of ordinary skill in the art, such as by using gravity oil separators (API separators), plate separators or coalescing plate separators, separatory funnels, settling tanks, centrifugal separation (e.g., centrifugal water-oil separators, centrifugal settling devices, dewatering centrifuges), decanters, induced gas floatation such using microbubble technology, and skimming equipment.

EXAMPLES

The following examples demonstrate the method of recovering hydrocarbon from a reservoir using functionalized and non-functionalized date-leaf nanoparticles, as described herein. The examples are provided solely for illustration and are not to be construed as limitations of the present disclosure, as many variations thereof are possible without departing from the spirit and scope of the present disclosure.

Example 1: Materials

The date leaves were collected from the date gardens of the King Fahd University of Petroleum and Minerals (KFUPM) campus. Concentrated $H_2SO_4$ and concentrated $HNO_3$ were obtained from Sigma-Aldrich. Deionized water was used in the experiments. Other materials used in the method of the present disclosure are: (1) 99.9% pure sodium chloride (NaCl), (2) distilled water, and (3) chemical dissolvent: naphtha, ethel-methyl ketone, and acetone.

Figure 2:
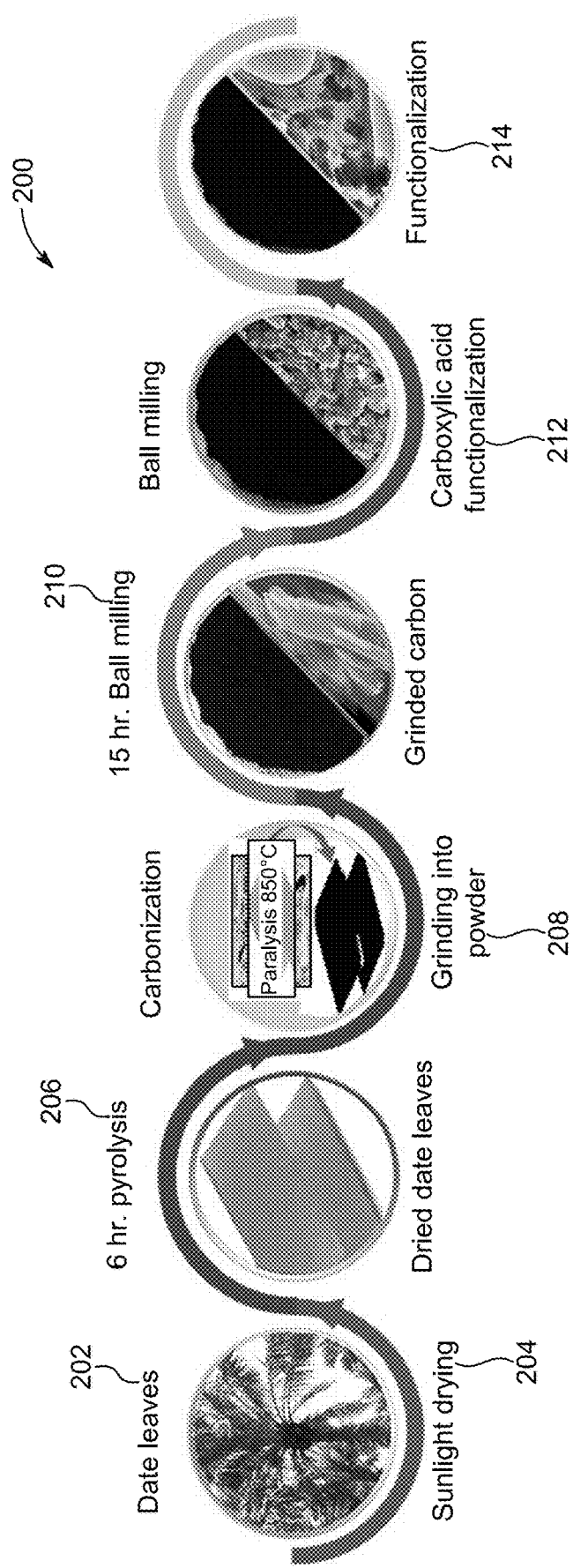
FIG. 2 is a schematic representation of preparation of functionalized cate lead carbon nanoparticles, according to certain embodiments of the present disclosure.

Example 2: Preparation of the Date Leaf Carbon Nanoparticles and Carboxylic Acid Functionalization FIG. 2 is a schematic illustration depicting a method for preparing the carboxylic acid functionalized date leaf carbon nanoparticles. For this purpose, date leaves collected from the date gardens on the King Fahd University of Petroleum and Minerals (KFUPM) campus served as the source of raw material (202). After collection, they were dried entirely in the sunlight and then cleaned with distilled water and oven-dried at 110° C. for 24 hours to remove any moisture content (204). The leaves were then shredded into pieces 2 to 3 cm long and pyrolyzed in a tube furnace under an $N_2$ atmosphere at 850° C. for approximately 3 hours at heating and cooling rates of 10° C. and 5° C., respectively (206). The pyrolytic carbon from the dried date leaves was then powdered using a kitchen blender for approximately 5 minutes to form ground carbon (208). Next, the ground carbon was subjected to a high-energy ball-milling technique to synthesize the nanoparticles. The ball-milling machine was operated at a speed of 3,000 rpm for approximately 15 hours (210). The particle size reduction was monitored at different intervals of 3, 9, and 15 hours using microscopic analysis. Zirconium balls of 600 to 800 μm size at a ratio of 1:20 by mass of Zr to carbon content were used during the ball-milling process (212). After completing the ball milling, the surface of the nanocarbon was modified via carboxylic functionalization with sulfuric and nitric acid, as per previous studies [Aziz, M. A., Theleritis, D., Al-Shehri, M. O., Ahmed, M. I., Qamaruddin, M., Hakeem, A. S., Helal, A., & Qasem, M. A. A. (2017). A Simple and Direct Preparation of a Substrate-Free Interconnected Nanostructured Carbon Electrode from Date Palm Leaflets for Detecting Hydroquinone. Chemistry Select, 2(17), 4787-4793; and Aziz, M. A., & Yang, H. (2008). Surfactant and polymer-free electrochemical micropatterning of carboxylated multiwalled carbon nanotubes on indium tin oxide electrodes. Chemical Communications, 7, 826-828] (214), both of which are incorporated herein by reference in their entireties]. In some embodiments, 1 g of the carbon particles (obtained after 15 hours of ball milling) was added to a mixed acid solution (1 L of concentrated $H_2SO_4$ and concentrated $HNO_3$) at a ratio of 3:1 by volume. The mixture was ultrasonicated for 5 hours to form the carboxylic group. The sonicated solution was then diluted with deionized water and kept undisturbed for 8 hours to settle the carboxylated carbon mass on the bottom of the beaker. The mother liquid segregated at the top was decanted. This procedure was repeated six times. Finally, the carboxylic-functionalized carbon was filtered and dried for 24 hours at 60° C. The preparation process for the functionalized date carbon is shown schematically in FIG. 2.

Example 3: Characterization

The morphologies of the ground carbon, 15-hour ball-milled carbon, and carboxylic acid-functionalized carbon were characterized by field emission scanning electron microscopy (FE-SEM) (Tescan Lyra-3) and transmission electron microscopy (TEM) (JEM-2011, JEOL). Elemental analysis was carried out using energy-dispersive X-ray spectroscopy (the Lyra-3 attachment to the FE-SEM through the LINK INCA program). Surface area, pore size distribution, and structural information were obtained using BET and Raman spectroscopic analysis. All analyses were performed at the KFUPM in Saudi Arabia.

Example 4: Determination of the Interfacial Tension (IFT)

Figure 3:
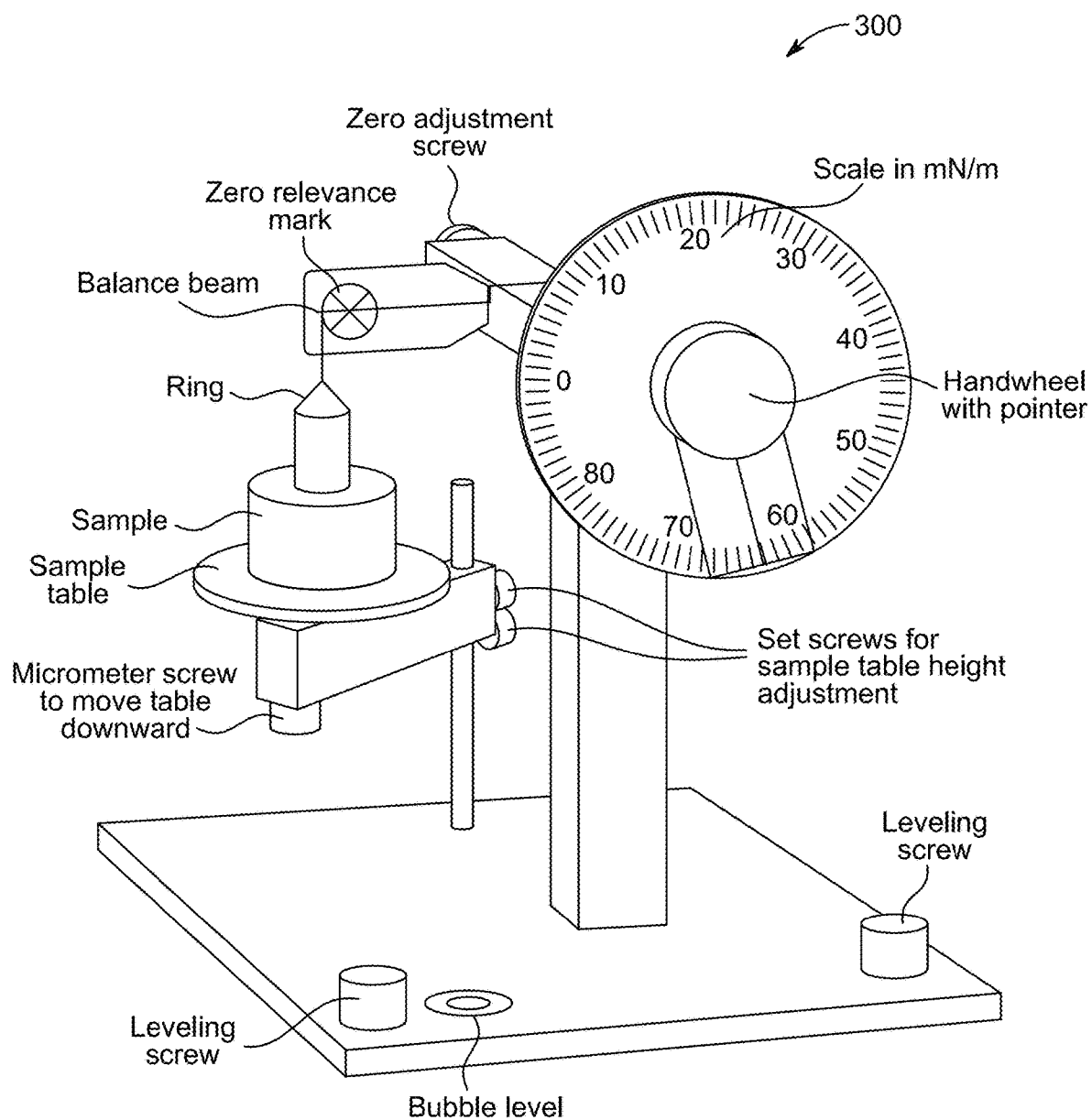
FIG. 3 is a schematic diagram of an interfacial tensiometer, according to certain embodiments of the present disclosure.

IFT values between the Arabian light crude oil and the date leaf solutions were measured according to standard ASTM D971-99a at different mixing ratios. The IFT experiment may be conducted on a Force tensiometer K6 by KRÜSS GmbH. For this purpose, six samples of date lead carbon nanoparticles (DLCNP) were prepared at a concentration range of 200 mg/l to 800 mg/l with de-ionized distilled water. Arabian light crude oil (f), 25° C.=0.8286 g/cc) was obtained from the Saudi Aramco company. The IFT values were then measured via the ASTM D971-99a method with the interfacial tensiometer (FIG. 3). A interfacial tensiometer is a device for measuring the surface tension of a liquid and/or the interfacial tension (IFT) between two liquids. The step-by-step process for determining the IFT values with the interfacial tensiometer (300) is presented.

Firstly, the glass containers for the experiment were cleaned using naphtha, ethel-methyl ketone, and an acetone chemical solvent. After rinsing with tap and distilled water, the glass containers were dried and covered using aluminum foil to keep them safe and clean. Secondly, naphtha, ethel-methyl ketone, and an acetone chemical dissolvent were used to clean the Du Nay ring. A butane gas flame was used as a flaming agent for approximately 5 seconds until the equipment slightly glowed orange. The ring dimensions are given in Table 1.

TABLE 1

| Ring dimensions | |
| --- | --- |
| Circumference of the ring, C, mm | 60.1 |
| The radius of the ring/the radius of the wire | 53.8384 |

Thirdly, at an ambient temperature of 25° C., the densities of the crude oil and samples were measured to ascertain the density difference between the two liquid phases. Table 2 lists the densities obtained.

TABLE 2

| | Density measurements at 25° C. | | | | | | |
| --- | --- | --- | --- | --- | --- | --- | --- |
| Sample | $H_2O$ | Oil | 100 ppm | 200 ppm | 400 ppm | 600 ppm | 800 ppm |
| ρ@25° C. (gm/cc) | 0.9970 | 0.8286 | 0.99718 | 0.99722 | 0.99725 | 0.99730 | 0.99735 |
| Delta ρ@25° C. (gm/cc) | — | — | 0.16858 | 0.16862 | 0.16865 | 0.16870 | 0.16875 |

Note: Delta ρ is the difference in density between heavy and light phases

Fourthly, the heating system was connected to the interfacial tensiometer and set to the above temperature. Fifthly, intermittently during the experiment, the glass containers were cleaned, and the interfacial tensiometer was calibrated to avoid an error. This was achieved by ensuring that the surface of the tensiometer was calibrated to avoid an error, and also to ensure that the surface tension of the distilled water measured at 25° C. fell within 71 to 73 dyne/cm. Any value outside this range signified an error from the calibration or glass. Sixthly, each sample was poured into a clean glass container to a depth of 10 to 15 mm. After waiting for approximately 12 min, the temperature stabilized at 25° C. Seventhly, the ring was immersed in the sample such that its depth was less than 6 mm. Then, the heavy phase was carefully covered with crude oil such that its center was more than 10 mm. Eighthly, after aging the sample-oil interface for approximately 30 seconds, the rupture value was recorded by lowering the platform. Finally, the IFT was corrected through the software built into the Sigma 702 force tensiometer. The Zuidema and Waters method was used to correct the IFT value.

Example 5: Influence of Pressure and Temperature on the DLCNP

Figure 4:
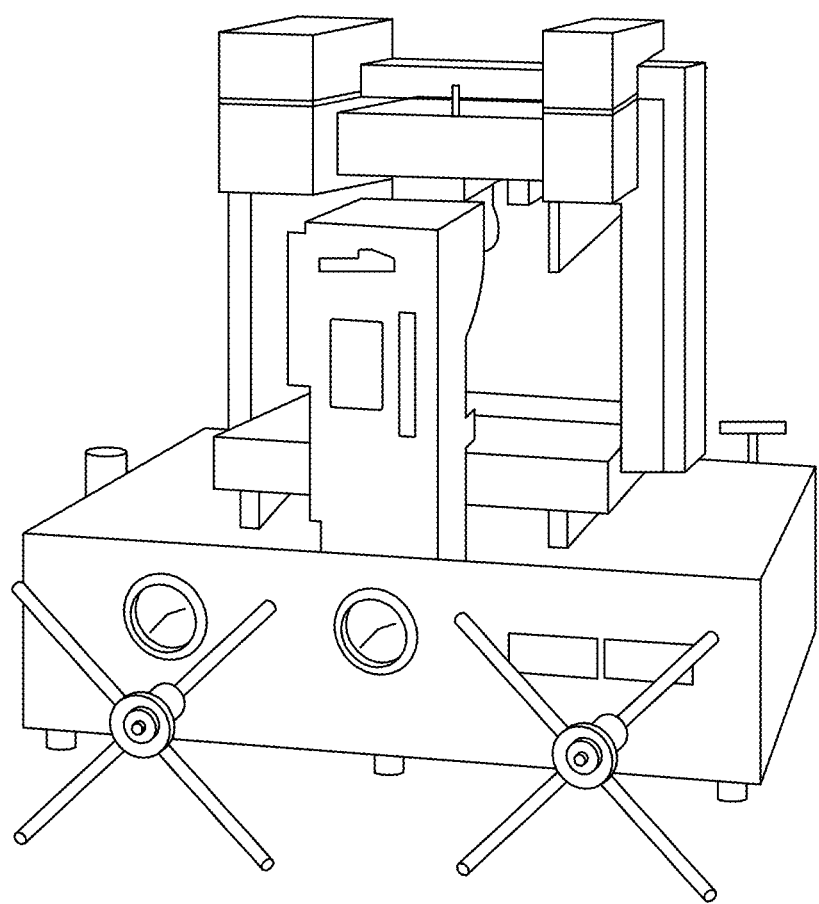
FIG. 4 is a pictorial image of a drop shape analyzer (DSA) 100, according to certain embodiments of the present disclosure.

The effect of temperature and pressure on the DLCNPs was determined by a Drop Shape Analyzer (DSA) 100. The DSA100 system solution allows for semi-automatic measurement of the static and dynamic contact angle and the scientific assessment of wettability by means of surface free energy (SFE). FIG. 4 is an exemplary pictorial representation of the DSA 100. It consists of high-pressure and temperature IFT cell, pressure and temperature controllers, a vibration-free table, oil, and water stock cells, needles, a hand pump, a back pressure regulator, and an imaging system including a camera, lamp, and software to help analyze the pictures captured. Oil drop dimensions and fluid densities are required to determine the IFT. Firstly, n-Hexane was used to clean the IFT cells, lines, and cylinder before applying acetone and water. The equipment was then dried with an airflow. Secondly, the IFT of water at 72.2 mN/m was used to calibrate the IFT cell under ambient conditions. The single-piston syringe pump and/or hand pump of the automated HP were used to fill both cells by transferring the relevant and required fluids. Thirdly, the IFT cell was filled with brine using the hand pump before calibrating the system. The system calibration was done by measuring the needle size while the software was running. Then, an oil bubble was formed by pumping crude oil through the needle. Brine injection set the test pressure into the cell, and a thermocouple was used to set the temperature surrounding the cell. Finally, after the desired pressure and temperature were attained for the measurement, the cell was kept for approximately 30 minutes under stable conditions to allow the two phases to reach equilibrium. At this point, the IFT was measured by actively running the software.

Example 6: Core Flooding Experiments

Figure 5:
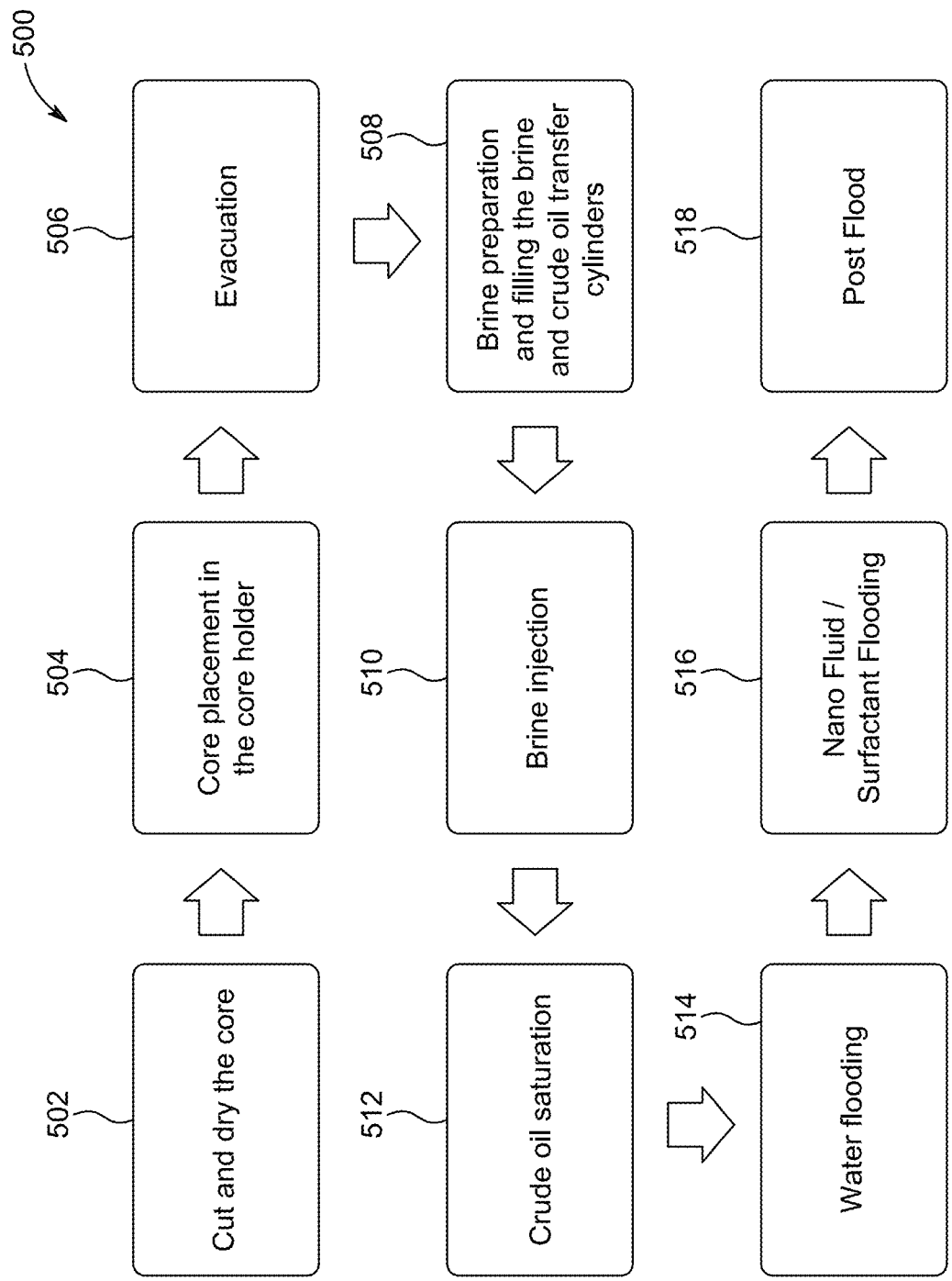
FIG. 5 is a process flow diagram of a core flood, according to certain embodiments of the present disclosure.

Core flood experiments were performed to determine the behavior of nanofluid inside a reservoir at reservoir pressure and temperature levels. The amount of oil recovered by a given formulation during a core flood can provide a good indication of the possible tertiary recovery potential at real reservoir conditions. The FDES-645Z core flooding system was used to conduct the experiment. The system is to simulate fluid flow in porous media in the reservoir. The system includes a positive displacement pump, (ISCO 500 D syringe pump) equipped with a programmable controller, to deliver fluids at constant flow rates at variable speeds up to 400 cm$^3$/min and pressure up to 2,000 psi. The pump is connected to three accumulators to deliver brine, oil, or chemical solutions. Accumulators with floating pistons rated up to 3,000 psi. and 250° F. were used to store and deliver fluids. A set of valves were used to control the injected fluid into the core sample. The core holder can accommodate a core plug with a diameter of 1.5 inches and a length of up to 20 inches. Pressure transducers were used to measure the pressure drop across the core. The flow was upward to eliminate gravity segregation effects. A back pressure regulator was used to control the flowing pressure downstream of the core. A second back pressure regulator was used to control the confining pressure on the core plug. A convection oven was used to provide temperature controlled environment. A data acquisition system was used to collect data from the pressure transducer. The steps for core preparation and core flooding experiment are provided in the experimental process flow diagram (500), as depicted in FIG. 5 (500).

At step 502, the method 500 includes cutting and drying the core samples. For this purpose, core samples, such as sandstone, were cut to a pre-determined size, with a length of about 3-6 inches, and a diameter of about 3-5 cm. The cut samples were dried to a temperature range of 80-120° C., preferably 90-110° C., preferably about 100° C. The cut samples may be vacuum saturated for about 6 to 10 hours, preferably 7-9 hours, preferably for about 8 hours.

At step 504, the method 500 includes placing the core in the core holder. The dried core sample was further loaded to the core holder and confining pressure, of less than 750 psi, was applied.

At step 506, the method 500 includes evacuation.

At step 508, the method 500 includes preparing the brine, and filling the brine and crude oil in transfer cylinders.

At step 510, the method includes injecting the brine into the core. This was done to establish 100% water saturation.

At step 512, the method includes crude oil saturation.

At step 514, the method 500 includes water flooding. Waterflooding refers to a method of oil recovery in which water or fluid is injected into a petroleum reservoir to sweep and displace mobile oil from a subterranean geological formation. The water injected increases pressure within the reservoir, replenishing the natural reservoir pressure that has been previously depleted in primary recovery, and physically sweeps the displaced mobile oil to adjacent production wells. Generally, the water or fluid used in a waterflooding process is taken from nearby water sources and is usually natural seawater, fresh water, produced water, aquifer water, river water, artificial saline water, or brine.

At step 516, method 514 includes nanofluid/surfactant flooding. Surfactant flooding is a technique used to increase oil production by injecting surfactants to reduce the interfacial tension (IFT) between oil and the displacing fluid. Surfactants may improve rock wettability, allow water to move faster, and ultimately enhance oil displacement.

At step 518, the method 500 includes post-flood. The observed and measured data of the core flood process after post-flood are presented in Tables 3 and 4, respectively. The formulation of the three nanoparticle combinations is given in Table 4.

TABLE 3

Core sample properties

| Core | Length (cm) | Diameter (cm) | Pore Volume (cc) | Porosity (C/0) | Permeability (md) |
|---|---|---|---|---|---|
| 1 | 15.24 | 3.81 | 34.55 | 20 | 183 |
| 2 | 15.08 | 3.79 | 32.91 | 19.35 | 125.9 |
| 3 | 15.23 | 3.79 | 33.63 | 19.44 | 96.3 |

TABLE 4

Fluid properties

| Core No | Formulation | Pressure (psis) | Temperature (° C.) | Injection rate (cc/minute) | Oil API @ 23° C. |
|---|---|---|---|---|---|
| 1 | 800 ppm DLCNP (functionalized) + 2% NaCl | 1050 | 50 | 0.5 | 30 |
| 2 | 800 ppm DLCNP (non-functionalized) + 0.5% APG + 2% NaCl | 1050 | 50 | 0.5 | 30 |
| 3 | 800 ppm CNT + 0.5% APG + 2% NaCl | 1050 | 50 | 0.5 | 30 |

Example 7: Field Emission Scanning Electron Microscopy

FIGS. 6A & 6B are the FE-SEM images of the ground carbon at two different magnifications. The corresponding elemental analysis is shown in FIG. 6C. From FIGS. 6A and 6B, it can be seen that the particle sizes of the ground carbon powder were widely distributed, typically ranging from 0.5 μm to 6 μm. The elemental analysis of the ground carbon indicated that C and O existed in significant quantities, while only traces of Si, Ca, K, and Mg was present. The Cu and Au peaks were caused by the copper substrate and gold coating on the sample's surface.

Figure 7A:
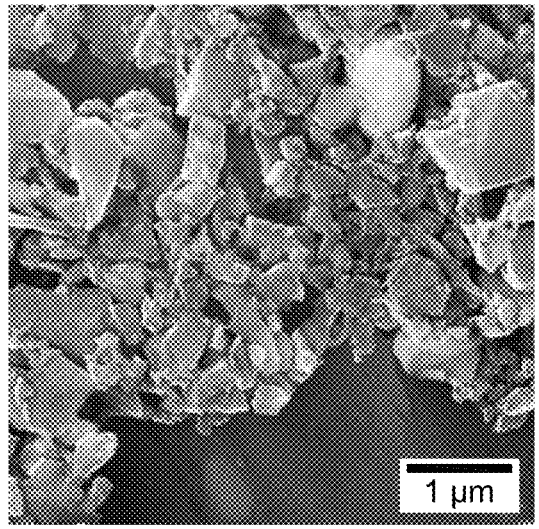
FIGS. 7A and 7B depict FE-SEM images of ball-milled carbon at two magnifications after 3 h, according to certain embodiments of the present disclosure.
Figure 7B:
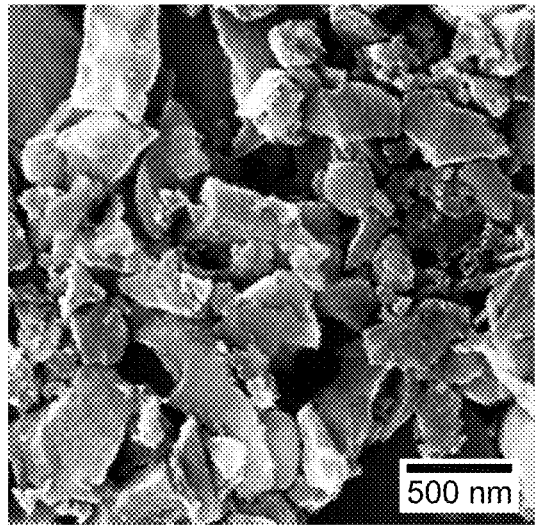
Figure 7C:
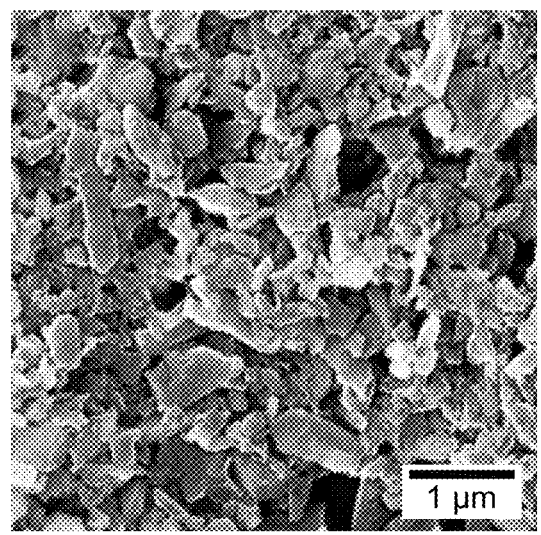
FIGS. 7C and 7D depict FE-SEM images of ball-milled carbon at two magnifications after 9 h, according to certain embodiments of the present disclosure.
Figure 7D:
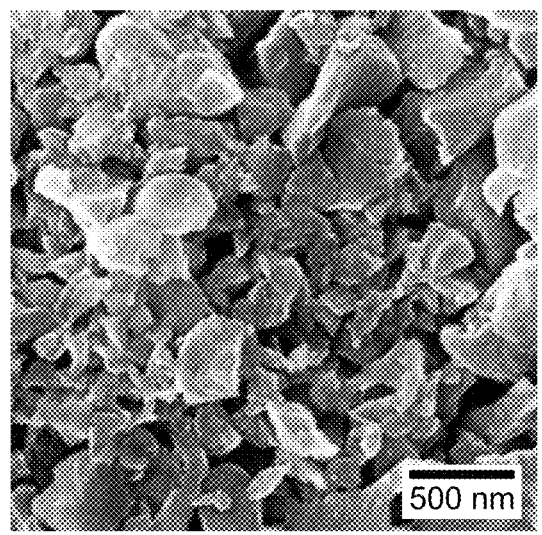
Figure 7E:
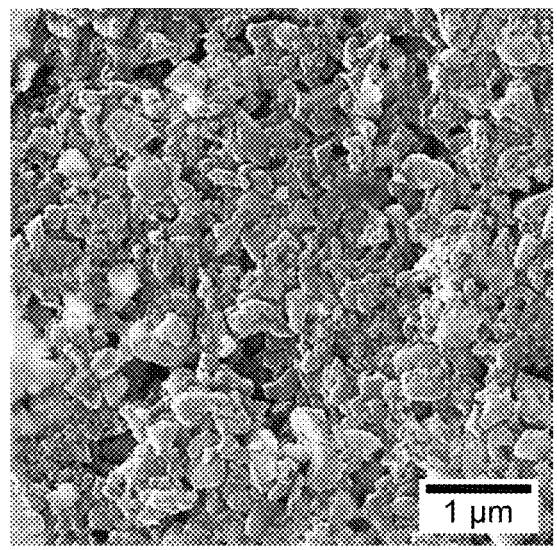
FIGS. 7E and 7F depict FE-SEM images of the ball-milled carbon at two magnifications after 15 h, according to certain embodiments of the present disclosure.
Figure 7F:
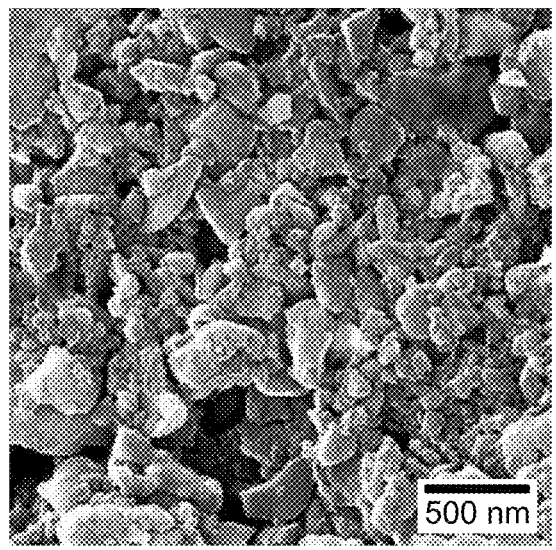
Figure 7G:
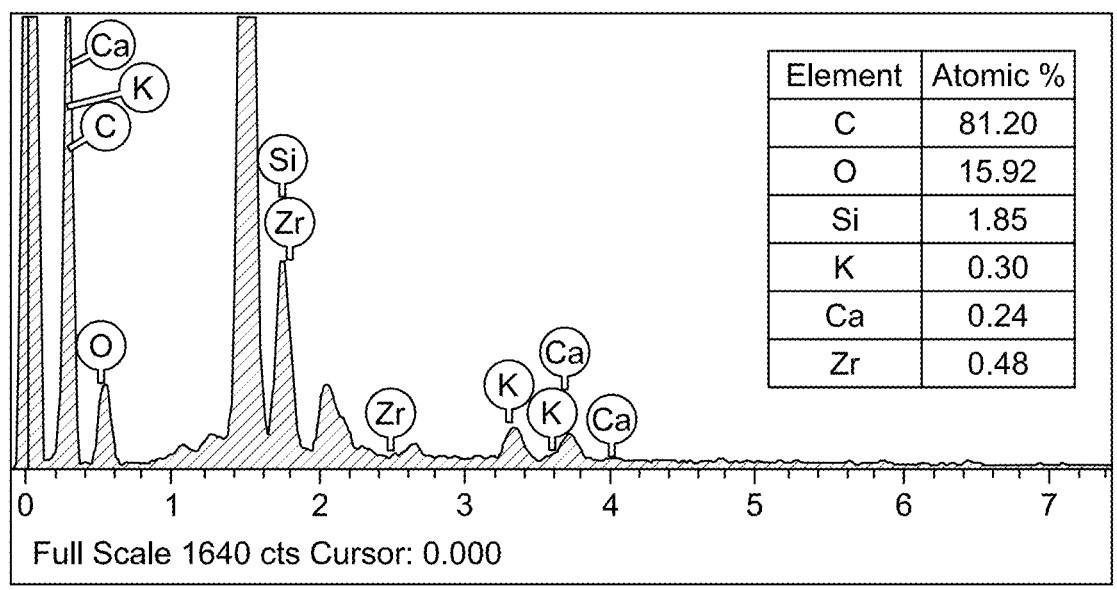
FIG. 7G is an EDS spectrum of the ball-milled carbon, after 15 h, according to certain embodiments of the present disclosure.

The size reduction of the carbon particles was monitored by measuring the grain size via FE-SEM imaging. FIG. 7A-FIG. 7F show the FE-SEM images of the ball-milled carbon at three intervals (3, 9, and 15 hours) on two magnification scales intended to measure the size reduction, while FIG. 7G represents the chemical composition of the 15 h ball-milled carbon. FIG. 7A and FIG. 7B are the FE-SEM images of the 3-hour ball-milled carbon at two magnifications (1 inn and 500 nm). The particle size was reduced significantly by ball milling. A typical particle size measurement on the FE-SEM images indicated particles of the following sizes: 28%>1 μm, 60% between 1 μm and 500 nm, and 12% between 500 and 300 nm. The average particle size was around 840 nm. FIG. 7C and FIG. 7D are the FE-SEM images of the 9 h ball-milled carbon at two magnifications (i.e., 1 μm and 500 nm). It can be observed that the particle size was further reduced by continued ball milling. Here the particle size was 7%>1 μm, 30% between 1 μm and 500 nm, 50% between 500 and 300 nm, and 12% between 300 and 100 nm, with an average particle size of 570 nm. Similarly, after 15 hours of ball milling, the particle size was significantly further reduced, i.e., particle sizes were 0%>1 picometer, 11% between 1 μm and 500 nm, 26% between 500 and 300 nm, 37% between 300 and 100 nm, and 26%<100 nm, with an average particle size of 270 nm. Hence, ball milling reduced the particle size of the carbon from a few microns to the submicron/nanoscale. The EDS is shown in FIG. 7G indicates the elemental composition of the nanocarbon. The presence of Zr is attributable to the zirconium balls used for the ball milling.

Example 8: Transmission Electron Microscopy

Figure 8C:
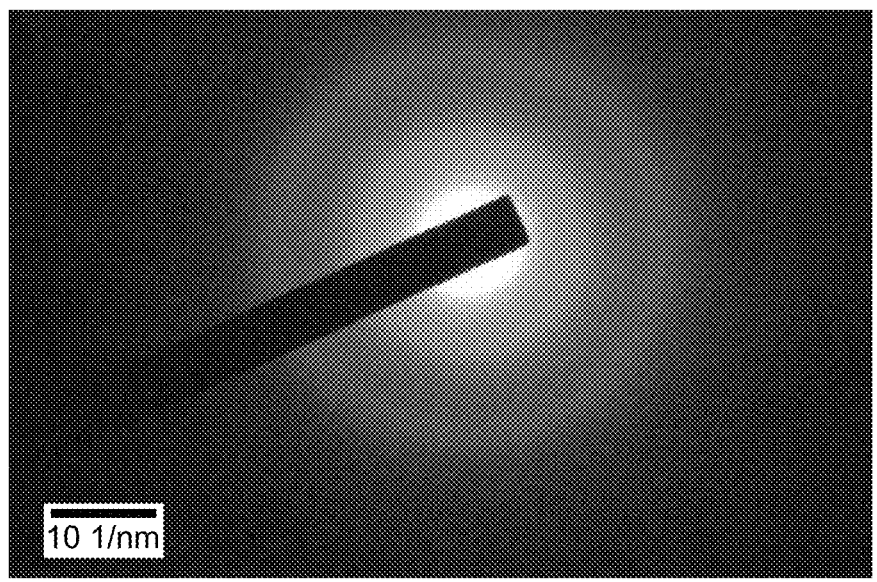
FIG. 8C is a selected area (electron) diffraction pattern (SAED) image of the carboxylic-functionalized nanosized date carbon, according to certain embodiments of the present disclosure.
Figure 8D:
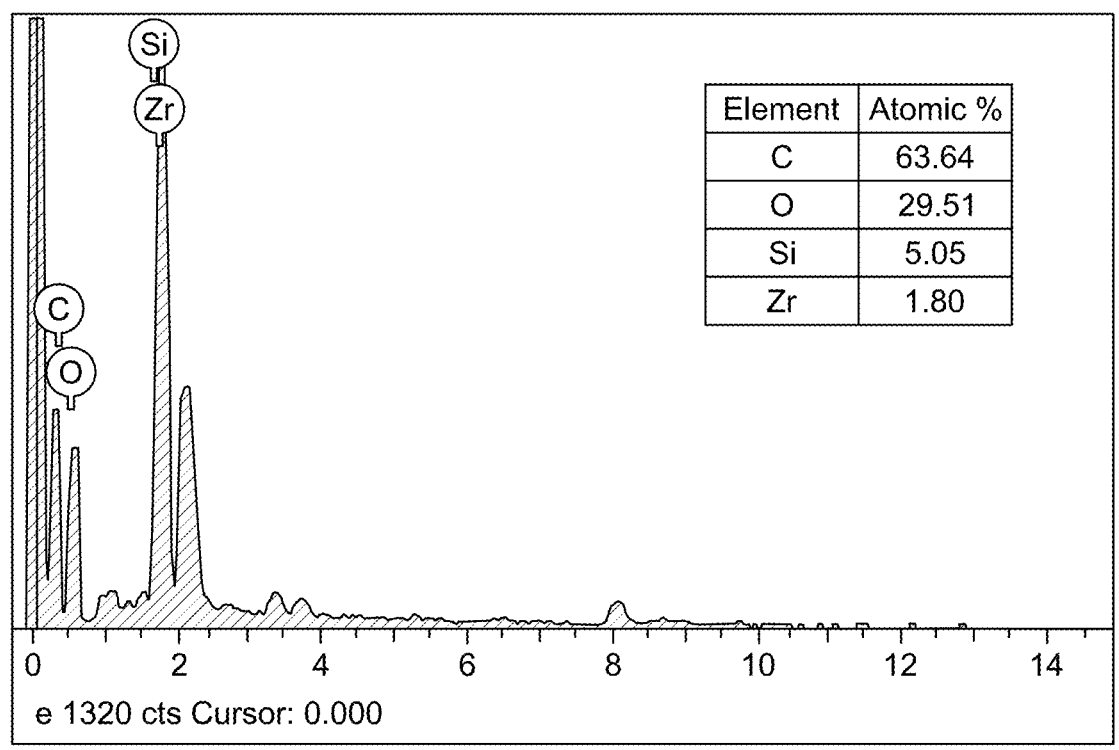
FIG. 8D shows an EDS of the carboxylic-functionalized nanosized date carbon, according to certain embodiments of the present disclosure.

FIG. 8A is the TEM image of the nanosized date carbon after functionalization with sulfuric and nitric acid at 200 nm magnification. The particle grain boundaries on the TEM grid are visible in FIG. 8A, indicating that the particle size was reduced due to the carboxylic functionalization; most of the particles shrank to the 50 to 150 nm range. The HR-TEM image (FIG. 8B) indicates the amorphous nature of the carbon, as no lattice fringes can be observed. This was also confirmed from the selected area electron diffraction (SAED) pattern shown in FIG. 8C. The elemental composition of the functionalized nanosized date carbon is shown in FIG. 8D, indicating that C and O were major elements while Si and Zr appeared only in trace amounts.

Example 9: BET Analysis

Figure 9:
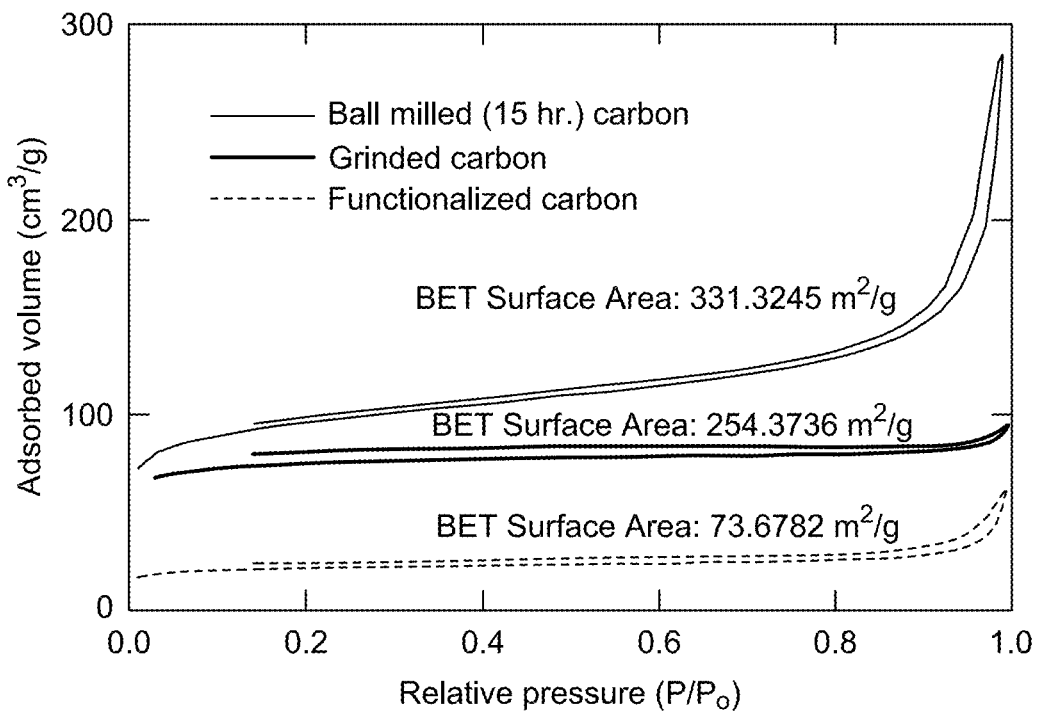
FIG. 9 is a plot depicting a Brunauer-Emmett-Teller (BET) isotherms of ground carbon, ball-milled carbon (15 h), and functionalized date carbon, according to certain embodiments of the present disclosure.
Figure 10A:
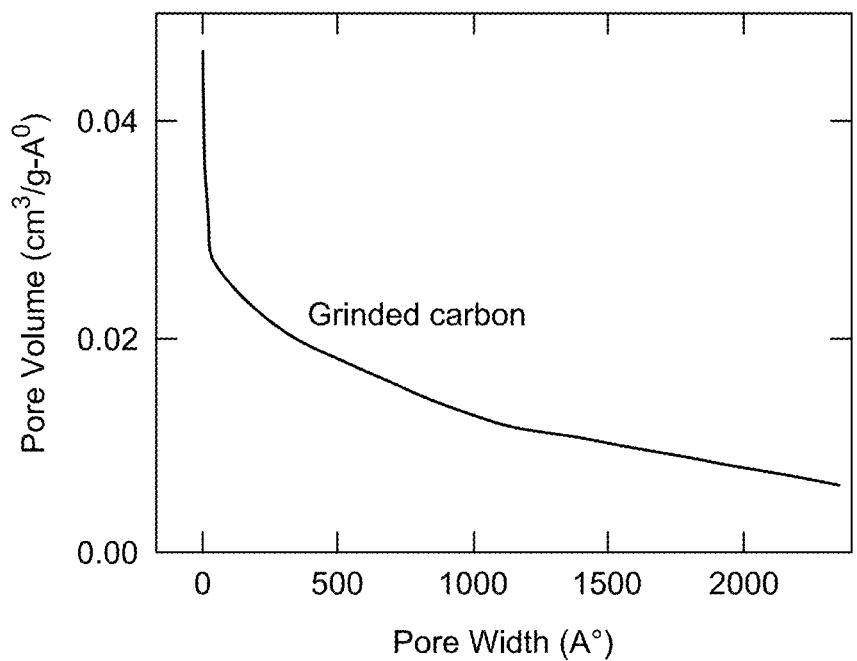
FIG. 10A is a Barrett-Joyner-Halenda (BJH) plot depicting pore size distribution of the ground carbon, according to certain embodiments of the present disclosure.
Figure 10B:
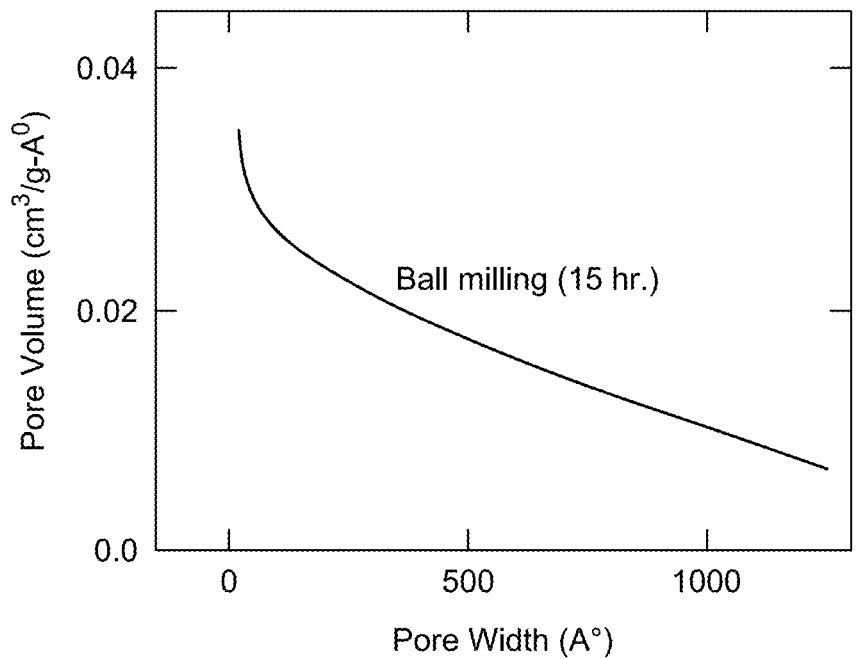
FIG. 10B is a BJH plot depicting pore size distribution of the ball-milled carbon (15 h), according to certain embodiments of the present disclosure.
Figure 10C:
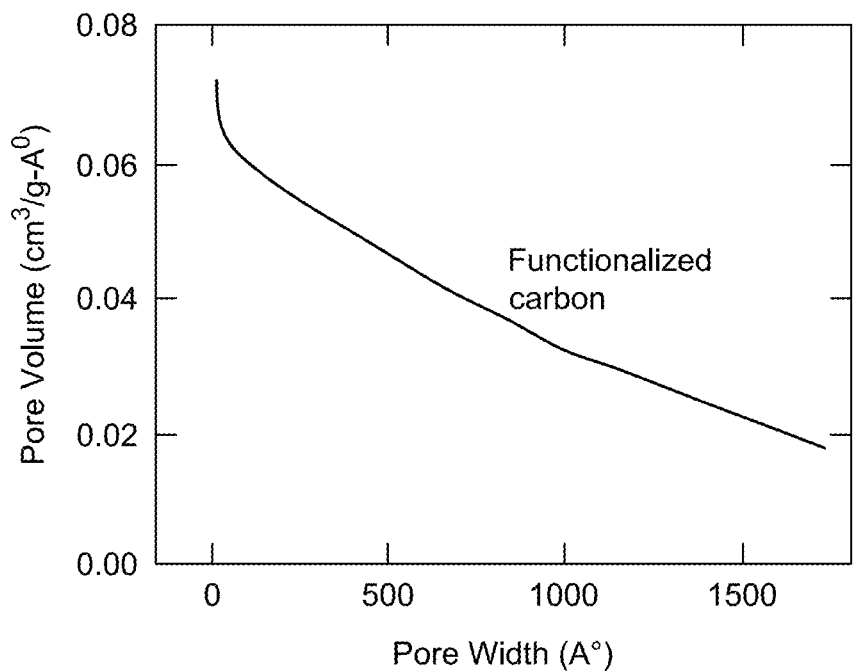
FIG. 10C is a BJH plot depicting pore size distribution of the functionalized date carbon, according to certain embodiments of the present disclosure.

The N2 adsorption-desorption isotherms at 77 K for the ground carbon, 15 h ball-milled carbon, and 15-hour ball-milled carboxylic-functionalized carbon are depicted in FIG. 9. As per the IUPAC classifications, the isotherms for the ground and functionalized carbon appeared to be Type I, indicating that the size distribution of the carbon was microporous. The overlapping adsorption-desorption curves indicate that the micro-porosity of the carbon was narrow and uniform. The 15-hour ball-milled carbon belonged to the Type II isotherm, with a relatively high adsorption/desorption capacity. The complete hysteresis loop between 0.4 and 1.0 $(P/P)^{\circ}$ indicated mesopores, while the sudden increase in adsorption from 0.9 to 1.0 $(P/P)^{\circ}$ demonstrated the presence of macropores [Thommes, M., Kaneko, K., Neimark, A. V., Olivier, J. P., Rodriguez-Reinoso, F., Rouquerol, J., & Sing, K. S. W. (2015). Physisorption of gases, with special reference to evaluating surface area and pore size distribution (IUPAC Technical Report). Pure and Applied Chemistry, 87(9-10), 1051-1069, both of which are incorporated herein by reference in their entireties]. The BET surface area of the ground carbon increased from 254.4 $m^2/g$ to 331.3 $m^2/g$ due to the 15 hours of ball milling, while the carboxylic functionalization of the 15 h ball-milled carbon significantly decreased the BET surface area from 331.3 to 73.7 $m^2/g$. This reduction in BET surface area, nearly five times that of the ball-milled carbon, can be attributed to the oxidation of the carbon with the acid. The decrease in BET surface area due to carboxylic functionalization is consistent with data reported in other studies [Aziz, M. A., Chowdhury, I. R., Mazumder, M. A. J., & Chowdhury, S. (2019). Highly porous carboxylated activated carbon from jute stick for removal of $Pb^{2+}$ from aqueous solution. Environmental Science and Pollution Research, 26(22), 22656-22669; and El-Shafey, E. I., Ali, S. N. F., Al-Busafi, S., & Al-Lawati, H. A. J. (2016). Preparation and characterization of surface-functionalized activated carbons from date palm leaflets and application for methylene blue removal. Journal of Environmental Chemical Engineering, 4(3), 2713-2724, which are incorporated herein by reference in their entireties]. The BJH pore size distributions of the ground, 15 h ball-milled, and functionalized date carbon are shown in FIGS. 10A-10C, respectively. FIG. 10A depicts the pore distribution of the ground carbon, with a pore width ranging from 1.9 nm to 230 nm, an average pore width of 2.1 nm, and a total pore volume of 0.13 $cm^3/g$. The average pore width and total pore volume increased to 3.67 nm and 0.30 $cm^3/g$ after 15 hrs of ball-milling, as can be observed from FIG. 10B. However, carboxylic functionalization of the ball-milled carbon reduced the average pore width to 3.164 nm and total pore volume to 0.058 $cm^3/g$, as shown in FIG. 10C. The physical properties of the date carbon at various stages of processing are tabulated in Table 5.

TABLE 5

BET adsorption/desorption properties of the date carbon

| State of carbon | BET surface area (m$^2$/g) | Langmuir surface area | Average pore width (4V/A) (nm) | Total volume (cm$^3$/g) |
|---|---|---|---|---|
| Ground carbon | 254.3736 | 338.5361 | 2.10 | 0.13 |
| Ball milled carbon (15 h.) | 331.3245 | 446.9846 | 3.67 | 0.30 |
| Functionalized carbon | 73.6782 | 98.69 | 3.164 | 0.058 |

Example 10: Raman Spectroscopy

Figure 11:
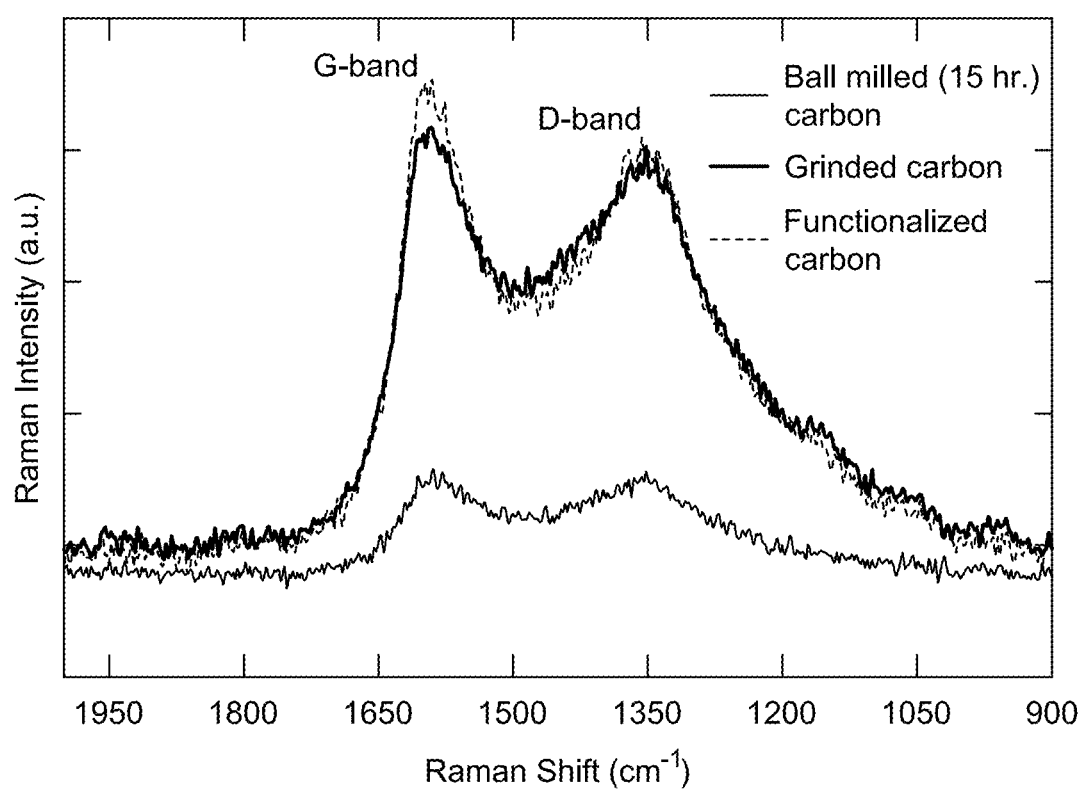
FIG. 11 is a Raman spectrum of the ground carbon, ball-milled carbon (15 h), and functionalized date carbon, according to certain embodiments of the present disclosure.

FIG. 11 shows the Raman spectrum of the ground pyrolytic date carbon (pyrolysis at 850° C.) after being ball-milled for 15 hours, and, subsequently, acid-functionalized, measured at a wavelength of 532 nm. The two intense peaks in the spectrum correspond to graphitization (G-band) and defects (D-band). The G-band and D-band peaks can be observed at around 1,591 cm$^{-1}$ and 1,352 cm$^{-1}$, respectively. For the 15 h ball-milled carbon, the G-band and D-band values were also around 1,589 cm$^{-1}$ and 1,352 cm$^{-1}$; while for the functionalized date carbon, the G-band and D-band values were 1,591 cm$^{-1}$ and 1,357 cm$^{-1}$. The intensities of the G- and D-bands of the ground carbon and functionalized date carbon were almost the same, but significantly lower and broader for the 15 h ball-milled carbon. The reason for lower intensity and broader type G and D bands of 15 hr ball-milled carbon indicate the presence large number of defect sites on the surface of it.

Example 11: IFT Measurements and Optimum Concentration at 25° C.

Figure 12:
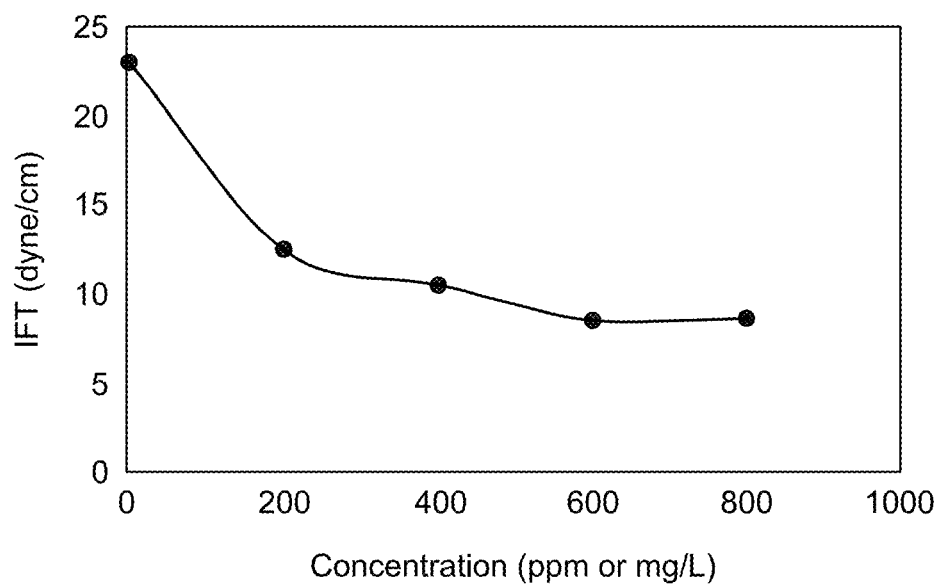
FIG. 12 is a plot of interfacial tension (IFT) versus date leaf carbon nanoparticles, at various concentrations, for Arabian light crude oil (laboratory conditions), according to certain embodiments of the present disclosure.

Six samples of DLCNPs were prepared at 200 mg/l to 800 mg/l concentration with de-ionized distilled water. Table 6 presents the IFT values, and FIG. 12 is a plot of the IFT values against their respective DLCNP concentrations. At a DLCNP concentration of 0.00 mg/l, the IFT was 23 dyne/cm. This value decreased to about 8.5 dyne/cm when the DLCNP concentration increased to 600 mg/l, above which it plateaued out; the optimum concentration was thus taken to be 600 mg/l.

TABLE 6

IFT and DLCNP Values at different concentrations

| DLCNP concentration (mg/l) | IFT dyne/cm |
|---|---|
| 0 | 23.00 |
| 200 | 12.50 |
| 400 | 10.50 |
| 600 | 8.50 |
| 800 | 8.60 |

Example 12: Influence of Temperature and Pressure on IFT

Figure 13:
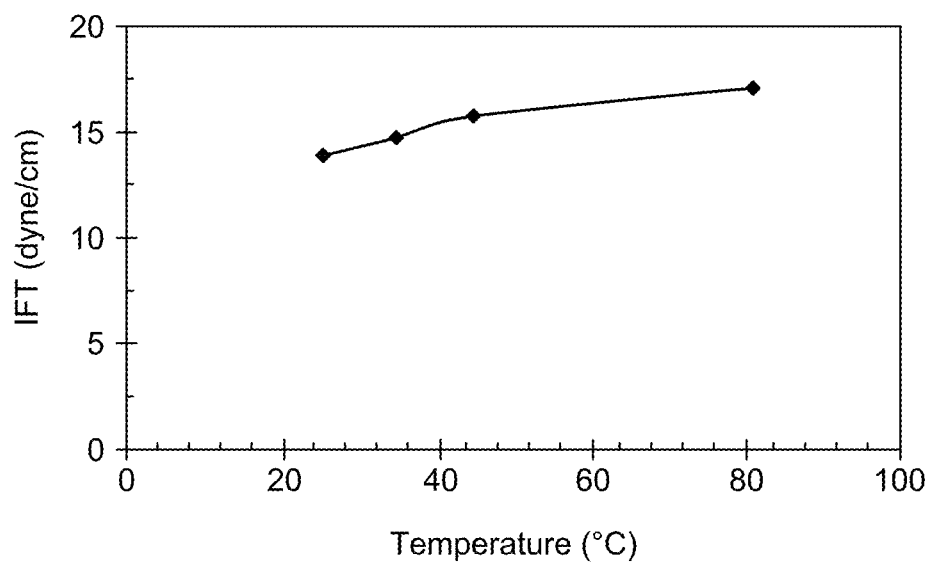
FIG. 13 is a plot depicting influence of temperature on the IFT, according to certain embodiments of the present disclosure.

The impact of temperature and pressure on IFT was observed by DSA 100. The IFT was measured at temperatures ranging from 25° C. to 81° C. The IFT increased from 14 dyne/cm to 17 dyne/cm as the temperature increased from 25° C. to 81° C., FIG. 13, and Table 7. Thus, a 56-degree rise in temperature only increased IFT by 3 dyne/cm. This means that temperature had only a minimal influence on the IFT values of DLCNP solutions.

TABLE 7

IFT Values for the DLCNP at different temperatures

| Temperature (° C.) | IFT (dyne/cm) |
|---|---|
| 25.5 | 13.91 |
| 35 | 14.76 |
| 45 | 15.79 |
| 81.3 | 17.09 |

Figure 14:
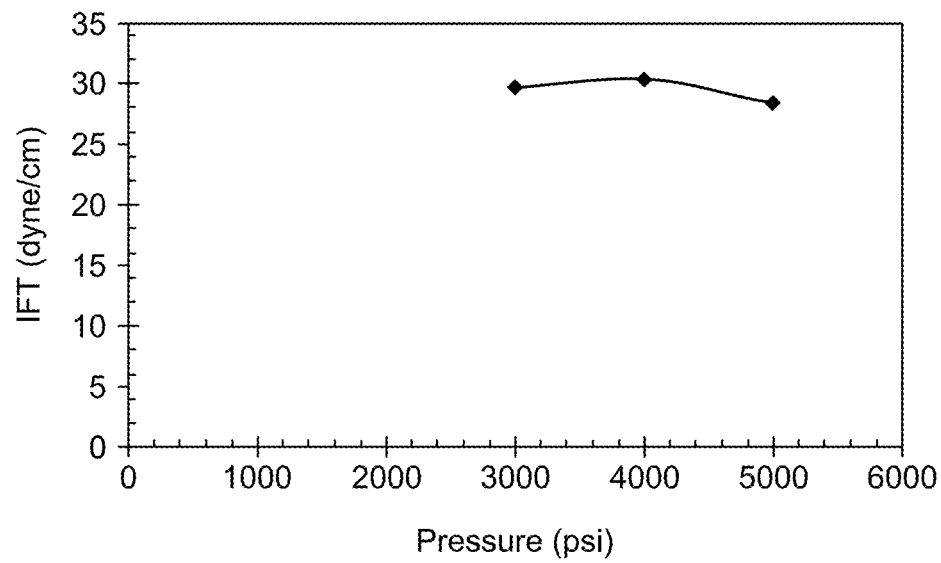
FIG. 14 is a plot depicting influence of pressure on the IFT, according to certain embodiments of the present disclosure.

The IFT values of the DLCNP solutions were measured with pressures varying from 3,000 psi to 5,000 psi. There was a 2 dyne/cm change in IFT (from 28 dyne/cm to 30 dyne/cm), FIG. 14 and Table 8; thus, a minimum influence of pressure on IFT is from the 3,000 psi to 5,000 psi pressure range.

TABLE 8

IFT values for the DLCNP at different pressures.

| Pressure (psi) | IFT (dyne/cm) |
|---|---|
| 3000 | 29.62 |
| 4000 | 30.33 |
| 5000 | 28.31 |

Example 13: Core Flooding

Three core flood experiments were conducted to test the EOR capability of functionalized and non-functionalized DLCNP. The first experiment was conducted to evaluate the effect of functionalized DLCNP on the TOR. The second experiment was conducted to determine the effect of a mixture of non-functionalized DLCNP and a non-ionic green surfactant on the TOR in the EOR process. The last experiment was conducted to compare the TOR of the DLCNP with that of CNT.

Example 14: Formulation 1—Functionalized DLCNP

Figure 15:
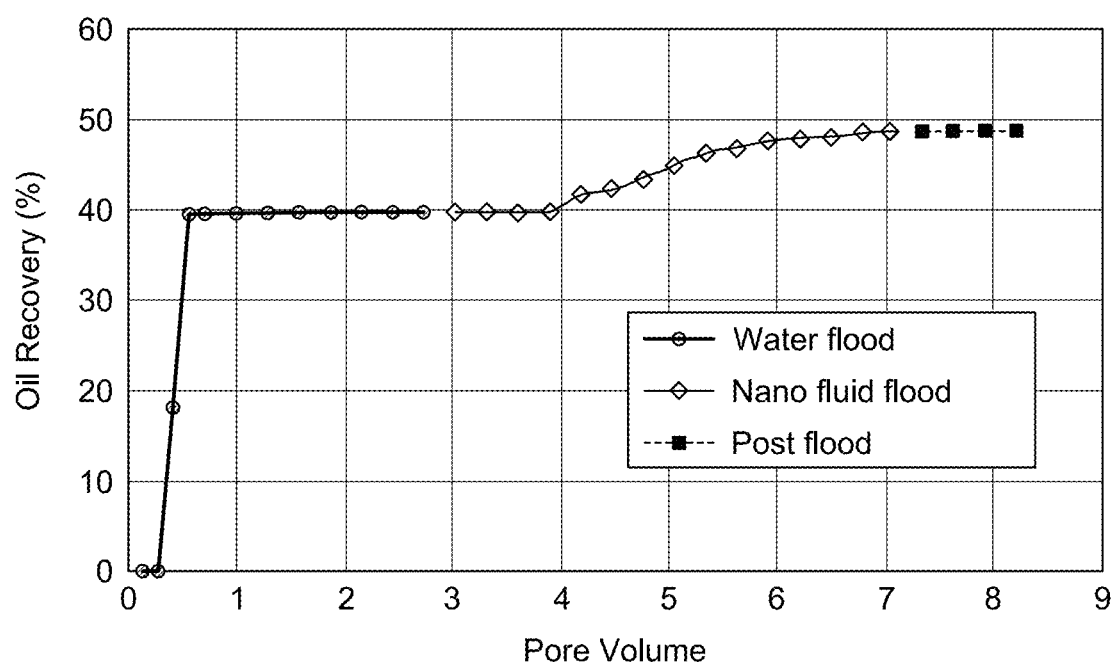
FIG. 15 is a plot depicting percentage of oil recovery observed after water and nanofluid flooding, according to certain embodiments of the present disclosure.
Figure 16:
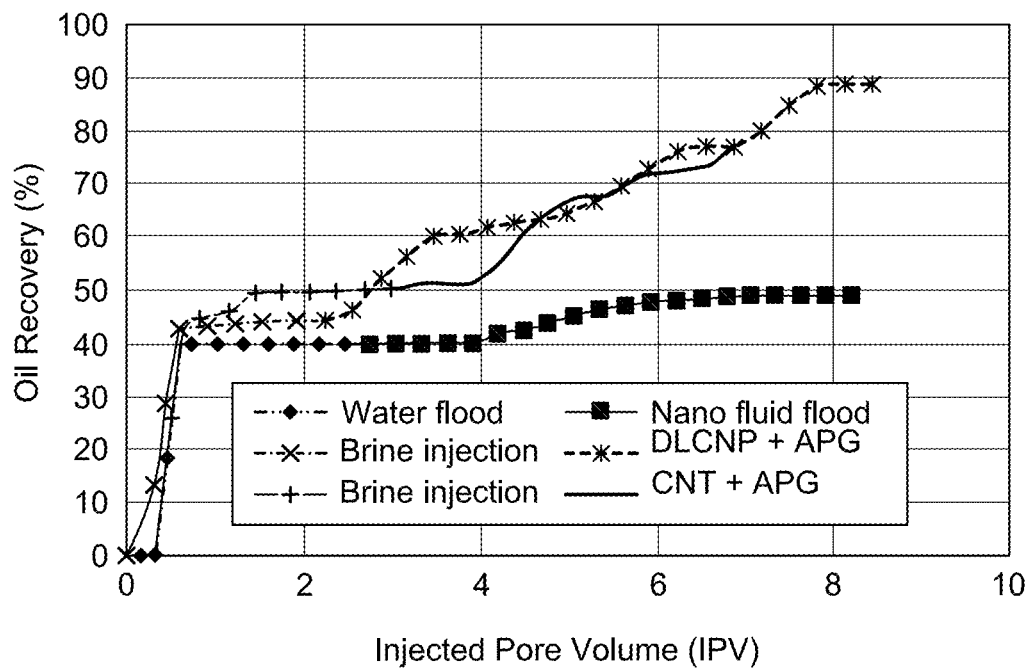
FIG. 16 is a plot depicting percentage of oil recovery measured for various tested formulations (brine, water, nanofluid, functionalized date leaf carbon nanoparticles with surfactant, a mixture of carbon nanotubes and a non-ionic surfactant), according to certain embodiments of the present disclosure.

The impact of DLCNP and distilled water on oil recovery was studied via a core flood experiment. For this purpose, 800 mg/l (ppm) of DLCNP was mixed with distilled water. After water flooding, secondary oil recovery was 40% of the oil initially in place (OIIP), FIGS. 15 and 16 and Table 5. About three pore volumes of nanofluid were then injected into the core, and incremental oil recovery was 9%; thus, total oil recovery was 49% of OIIP. FIG. 16 is a plot depicting percentage of oil recovery measured for various tested formulations (brine; water; nanofluid; functionalized date leaf carbon nanoparticles with surfactant; and a mixture of carbon nanotubes and a non-ionic surfactant). From FIG. 16, it can be observed that the oil recovery percentage was found to be maximum with the formulation having a mixture of the DLCNP and the surfactant (APG), in comparison to the other tested formulation. FIG. 16 shows the complete recovery calculated after brine and DLCNP mixture flooding.

Example 15: Comparison of the DLCNP with Carbon Nanotubes

Figure 17:
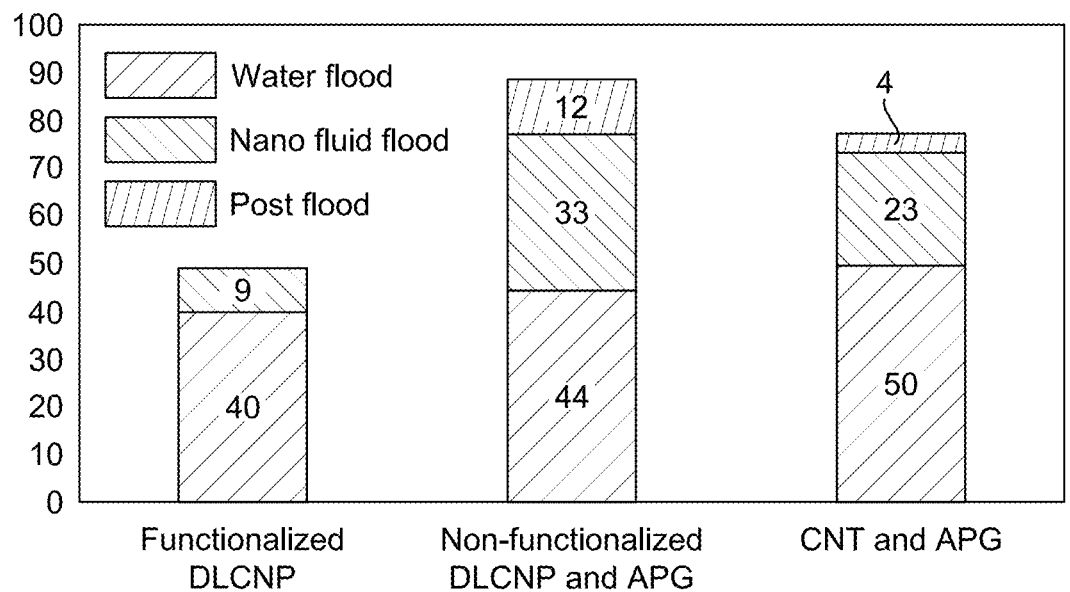
FIG. 17 is a bar graph depicting the percentage of oil recovery with various tested formulations (functionalized DLCNP; non-functionalized DLCNP, and surfactant; and carbon nanotubes with surfactant), according to certain embodiments of the present disclosure.

A batch of (non-functionalized) DLCNP was prepared and compared with (non-functionalized) CNT. Core floods for two selected formulations (compositions are summarized in Table 9) were conducted as described in Haq, B., The role of carbon nanotubes (CNTs) and carbon particles in green enhanced oil recovery (GEOR) for Arabian crude oil in sandstone core. The APPEA Journal, 60(1), 133. The role of carbon nanotubes (CNTs) and carbon particles in green enhanced oil recovery (GEOR) for Arabian crude oil in sandstone core. The APPEA Journal, 60(1), 133). The impact of the non-functionalized DLCNP and non-ionic surfactants mixture together with NaCl on oil recovery was studied in the experiment. In this formulation, non-ionic surfactant APG 264 of 0.5% and non-functionalized DLCNP of 800 mg/l (ppm) were mixed with 2% NaCl. The results of this formulation are presented in FIG. 17. In the water flooding stage, secondary oil recovery was 44% of Oil Initially in Place (OIIP). In surfactant flooding, there was 33% oil production after 4.6 PVs of nanofluid injection and 12 33% oil production after 1.3 PVs of brine injection. Total tertiary oil recovery was 45%. In the third formulation, the non-ionic surfactant APG 264 of 0.5% and CNT of 800 mg/l (ppm) were mixed with 2% NaCl. The results of this formulation are presented in FIG. 17. In the water flooding stage, secondary oil recovery was 50% of OIIP. In surfactant flooding, there was 23% oil production after 3.3 PVs of nanofluid injection and 4% oil production after 0.6 PVs of brine injection. Total tertiary oil recovery was 27%. A summary of the three formulation results appears in Table 9, FIGS. 16 & 17.

TABLE 9

Summary of the three EOR Formulations

| Expt. No | Core No | Formulations | Secondary Oil | Tertiary Oil Recovery (%) | Total recovery |
|---|---|---|---|---|---|
| 1 | 1 | Functionalized 800 mg/l (ppm) DLCNP, | 40 | 9 | 49 |
| 2 | 2 | Non-functionalized 800 mg/l (ppm) DLCNP, 0.5% APG | 44 | 45 | 89 |
| 3 | 3 | 800 mg/l (ppm) CNT, 0.5% APG, and 2% | 50 | 27 | 77 |

To conclude, date leaf carbon nanoparticles were prepared from a cheap source via a direct and straightforward method (i.e., pyrolysis at 850° C. and ball milling for 15 h). The surface of the nanocarbon was carboxylic acid-functionalized using an acid treatment and applied in EOR application. The prepared carbons were characterized using FE-SEM, TEM, EDS, Raman spectroscopy, and BET. The particle size of the carboxylic acid-functionalized carbon ranged from to 150 nm. The IFT values between the Arabian light crude oil and different concentrations of aqueous DLCNP were measured. DLCNP reduced the IFT by about 41%, from 14.46 to 8.56 dyne/cm at 25° C. Only a minimal influence of pressure and temperature on the IFT between the DLCNP solutions and Arabian light crude oil was measured. Core flood experiments with Berea sandstone confirmed that a concentration of 800 ppm carboxylated DLCNP mixed with distilled water could recover 9% of the residual oil and 49% of the OIIP. An 800-ppm sample of non-functionalized DLCNP was blended with 0.5 wt. % non-ionic green surfactant APG and 2 wt. % NaCl brine; this produced 45% tertiary oil and 89% OIIP recovery. This formulation performed better than the commercially available CNT.

Numerous modifications and variations of the present disclosure are possible in light of the above teachings. It is therefore to be understood that within the scope of the appended claims, the invention may be practiced otherwise than as specifically described herein.

The invention claimed is:

1. A method of recovering a hydrocarbon from a reservoir, comprising:
   injecting an oil recovery formulation into the reservoir;
   wherein the oil recovery formulation comprises date leaf particles selected from the group consisting of carboxylic acid functionalized date leaf particles and non-functionalized date leaf particles;
   wherein a weight ratio of the carboxylic acid functionalized date leaf particles and the non-functionalized date leaf particles is in a range of 100:1 to 1:100;
   wherein the date leaf particles have an average particle size of 30 to 950 nm; and
   collecting the hydrocarbon from the reservoir;
   wherein the carboxylic acid functionalized date leaf particles comprise 60 to 70 atomic % carbon, 25 to 35 atomic % oxygen, 3 to 7 atomic % silicon, and 1 to 3 atomic % zirconium, each atomic % based on a total number of atoms in the carboxylic acid functionalized date leaf particles by Energy-dispersive X-ray spectroscopy.

2. The method of claim 1, wherein the carboxylic acid functionalized date leaf particles are in a form of nanoparticles having an average particle size of 30 to 300 nm.

3. The method of claim 1, wherein the non-functionalized date leaf particles have an average particle size of 50 to 950 nm.

4. The method of claim 1, wherein the carboxylic acid functionalized date leaf particles are porous with a hierarchical pore structure.

5. The method of claim 1, wherein the carboxylic acid functionalized date leaf particles have a specific surface area in a range of 50 to 100 $m^2/g$.

6. The method of claim 1, wherein the carboxylic acid functionalized date leaf particles have a cumulative specific pore volume in a range of 0.01 to 0.1 $cm^3/g$.

7. The method of claim 1, wherein the carboxylic acid functionalized date leaf particles have an average pore width of 1 to 5 nm.

8. The method of claim 1, wherein the non-functionalized date leaf particles have a specific surface area in a range of 280 to 380 $m^2/g$.

9. The method of claim 1, wherein the non-functionalized date leaf particles have a cumulative specific pore volume in a range of 0.1 to 0.5 $cm^3/g$.

10. The method of claim 1, wherein the non-functionalized date leaf particles have an average pore width of 2 to 6 nm.

11. The method of claim 1, wherein the carboxylic acid functionalized date leaf particles are present in the oil recovery formulation at a concentration of 100 to 1500 mg/L, based on a total weight of the oil recovery formulation.

12. The method of claim 1, wherein the carboxylic acid functionalized date leaf particles have a critical micelle concentration in water of 500 to 700 mg/L.

13. The method of claim 1, wherein the oil recovery formulation further comprises one or more selected from the group consisting of a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitor, a catalyst, a surfactant, a preservative, a biocide, a thermal stabilizer, and a combination thereof.

14. The method of claim 1, wherein the hydrocarbon is an Arab Light crude oil, and the method is an enhanced oil recovery method.

15. The method of claim 14, wherein the injecting forms a mixture of the oil recovery formulation and the Arab Light crude oil with an interfacial tension of 5 to 30 dyne/cm.

16. The method of claim 1, wherein the reservoir has a temperature of 20 to 300° C., and a pressure of 50 to 5500 pound-force per square inch (psi).

17. A method of recovering a hydrocarbon from a reservoir, comprising:
injecting an oil recovery formulation into the reservoir,
wherein the oil recovery formulation comprises date leaf particles selected from the group consisting of carboxylic acid functionalized date leaf particles and non-functionalized date leaf particles;
wherein a weight ratio of the carboxylic acid functionalized date leaf particles and the non-functionalized date leaf particles is in a range of 100:1 to 1:100;
wherein the date leaf particles have an average particle size of 30 to 950 nm; and
collecting the hydrocarbon from the reservoir;
wherein the carboxylic acid functionalized date leaf particles are prepared from date leaves by:
cutting the date leaves and drying at 90 to 140° C.;
pulverizing the date leaves after the drying and pyrolyzing at 700 to 1000° C. to form pyrolyzed date leaf particles;
ball-milling the pyrolyzed date leaf particles in the presence of zirconium balls to form milled date leaf particles;
sonicating the milled date leaf particles in the presence of an acid solution comprising sulfuric acid and nitric acid to introduce carboxylic acid functional groups and form crude carboxylic acid functionalized date leaf particles; and
washing the crude carboxylic acid functionalized date leaf particles, collecting and drying to form the carboxylic acid functionalized date leaf particles.

18. The method of claim 17, wherein the zirconium balls have a size (diameter) in a range of 500 to 900 μm, and wherein a weight ratio of the zirconium balls to the pyrolyzed date leaf particles is in a range of 1:5 to 1:40.

* * * * *